(12) United States Patent
Chandrappa et al.

(10) Patent No.: US 11,726,808 B2
(45) Date of Patent: *Aug. 15, 2023

(54) CLOUD-BASED MANAGED NETWORKING SERVICE THAT ENABLES USERS TO CONSUME MANAGED VIRTUALIZED NETWORK FUNCTIONS AT EDGE LOCATIONS

(71) Applicant: Microsoft Technology Licensing, LLC, Redmond, WA (US)

(72) Inventors: Harish Kumar Chandrappa, Bothell, WA (US); Michelle Austine Liu, Seattle, WA (US); Swati Tiwari, Bellevue, WA (US); Nikhil K Ravi, Redmond, WA (US); Chakshu Sardana, Redmond, WA (US); Neelesh Kumar, Sammamish, WA (US); Viswanath Chennuru, Bothell, WA (US); Qiming Chen, Seattle, WA (US); Varun Prakash Shrivastava, Bellevue, WA (US); Ganesh Srinivasan, Redmond, WA (US); Karthik Ananthakrishnan, Woodinville, WA (US); Abhishek Tiwari, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,651

(22) Filed: Sep. 27, 2021

(65) Prior Publication Data

US 2022/0114008 A1 Apr. 14, 2022

Related U.S. Application Data

(63) Continuation of application No. 16/888,441, filed on May 29, 2020, now Pat. No. 11,132,217.
(Continued)

(51) Int. Cl.
*G06F 9/455* (2018.01)
*H04L 43/08* (2022.01)
(Continued)

(52) U.S. Cl.
CPC ...... *G06F 9/45558* (2013.01); *H04L 12/4641* (2013.01); *H04L 41/0803* (2013.01);
(Continued)

(58) Field of Classification Search
CPC .. G06F 9/45558; G06F 9/5077; G06F 11/301; G06F 11/3006; G06F 11/3409;
(Continued)

(56) References Cited

U.S. PATENT DOCUMENTS 10,785,166 B1\* 9/2020 Rothschild ............ H04L 67/563
11,526,405 B1\* 12/2022 Fisher ................. G06F 11/1464
(Continued)

OTHER PUBLICATIONS

"Notice of Allowance Issued in U.S. Appl. No. 16/830,082", dated Apr. 12, 2022, 9 Pages.
(Continued)

*Primary Examiner* — Kostas J Katsikis
(74) *Attorney, Agent, or Firm* — Ray Quinney & Nebeker P.C; James Bullough

(57) ABSTRACT

A method for providing a managed networking service for a cloud computing system enables users to consume managed virtualized network functions (VNFs) at edge locations. The method includes registering a plurality of third-party vendors for the managed networking service. The plurality of third-party vendors provide a plurality of VNFs for the
(Continued)

managed networking service. The method also includes receiving user input from a user of the cloud computing system. The user input includes a request to deploy the plurality of VNFs at an edge location. The plurality of VNFs can be provided by different third-party vendors through the managed networking service. The method also includes causing the plurality of VNFs to be deployed on an edge device that is located at the edge location. The plurality of VNFs can be represented as logical entities in a database that is utilized by the managed networking service.

20 Claims, 13 Drawing Sheets

Related U.S. Application Data

(60) Provisional application No. 62/929,941, filed on Nov. 3, 2019.

(51) Int. Cl.
*H04L 41/0813* (2022.01)
*H04L 41/0803* (2022.01)
*H04W 12/08* (2021.01)
*H04L 12/46* (2006.01)

(52) U.S. Cl.
CPC .............. *H04L 43/08* (2013.01); *H04W 12/08* (2013.01); *G06F 2009/45591* (2013.01); *G06F 2009/45595* (2013.01)

(58) Field of Classification Search
CPC . G06F 2009/45591; G06F 2009/45595; H04L 12/4641; H04L 41/22; H04L 41/0803; H04L 41/5051; H04L 43/08; H04W 12/08
See application file for complete search history.

(56) References Cited

U.S. PATENT DOCUMENTS

| | | | |
|---|---|---|---|
| 2018/0183682 A1* | 6/2018 | Niwa | H04L 43/16 |
| 2019/0272002 A1* | 9/2019 | Seenappa | G06F 1/324 |
| 2020/0162282 A1 | 5/2020 | Ashtaputre et al. | |

OTHER PUBLICATIONS

"First Action Interview Office Action Issued in U.S. Appl. No. 16/830,082", dated Oct. 20, 2021, 7 Pages.

* cited by examiner

CLOUD-BASED MANAGED NETWORKING SERVICE THAT ENABLES USERS TO CONSUME MANAGED VIRTUALIZED NETWORK FUNCTIONS AT EDGE LOCATIONS

CROSS-REFERENCE TO RELATED APPLICATIONS

This application is a continuation of U.S. patent application Ser. No. 16/888,441 (the '441 Application) filed on May 29, 2020. The '441 Application is related to and claims the benefit of U.S. Provisional Patent Application Ser. No. 62/929,941, filed Nov. 3, 2019. The aforementioned applications are expressly incorporated herein by reference in their entirety.

BACKGROUND

Cloud computing refers to the delivery of computing services over one or more computer networks, typically including the Internet. Some examples of computing services that can be provided by a cloud computing system include storage, databases, networking, software, and analytics. The use of cloud computing technology has grown rapidly in recent years, due at least in part to the development of high-capacity networks as well as relatively low-cost computers and storage devices.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users is generally via the Internet.

Edge computing refers to the movement of computing and storage resources closer to the location(s) where they are needed, in order to improve response times and save bandwidth. One benefit of edge computing is the ability to move workloads from devices into the cloud, where resources are less expensive and it is easier to benefit from economies of scale. Another benefit of edge computing is the ability to reduce latency and improve reliability by locating application components close to the devices.

Increasingly, network functions that have traditionally been performed by dedicated hardware devices (e.g., firewalls, gateways, routers, switches, load balancers) are being performed with general-purpose computers using virtualization technology. The term "virtualized network function" (VNF) refers to a software-based implementation of a network function. Individual VNFs can be chained or combined together and used in sequence to perform one or more networking-related functions.

In some situations, it can be beneficial for an organization to deploy a plurality of VNFs at an edge location. Presently, however, there is not a convenient way for an organization to do this. One potential challenge is the fact that the desired VNFs can be provided by different vendors. In this scenario, it would be necessary for the organization to make separate arrangements with each of the vendors to purchase and deploy the VNFs. Another challenge is that the organization would be responsible for chaining the VNFs together to perform the desired networking functions. Yet another challenge is that the organization would be responsible for managing and maintaining the VNFs (e.g., fixing problems, performing updates).

SUMMARY

In accordance with one aspect of the present disclosure, a method is disclosed for providing a managed networking service for a cloud computing system. The managed networking service enables users to consume managed virtualized network functions (VNFs) at edge locations. The method includes registering a plurality of third-party vendors for the managed networking service. The plurality of third-party vendors provide a plurality of VNFs for the managed networking service. The method further includes providing management tools that enable the plurality of third-party vendors to perform management functions for the plurality of VNFs. The method further includes receiving user input from a user of the cloud computing system. The user input includes a request to deploy the plurality of VNFs at an edge location. The plurality of are being provided by different third-party vendors through the managed networking service. The method further includes causing the plurality of VNFs to be deployed on an edge device that is located at the edge location. The method further includes representing the plurality of VNFs as logical entities in a database that is utilized by the managed networking service. The method further includes monitoring, from the cloud computing system, performance of the plurality of VNFs on the edge device. The method further includes associating performance information with the logical entities in the database. The method further includes providing the performance information in response to user requests related to the performance of the plurality of VNFs.

The user input may further include instructions for chaining the plurality of VNFs. The method may further include causing the plurality of VNFs to be chained based on the instructions.

The user input may further include configuration information for configuring the plurality of VNFs. The method may further include for each VNF of the plurality of VNFs providing the configuration information received from the user to a vendor of the VNF, obtaining a configuration script for configuring the VNF from the vendor, and causing the configuration script to be sent to and executed on the edge device.

The method may further include deploying additional VNFs within the cloud computing system in addition to the plurality of VNFs that are deployed at the edge location.

In accordance with another aspect of the present disclosure, a method for providing a mobile connectivity service for a cloud computing system is disclosed. The method includes registering a plurality of third-party vendors for the mobile connectivity service. The plurality of third-party vendors provide resources for implementing private mobile networks. The method further includes providing management tools that enable the plurality of third-party vendors to perform management functions for the resources. The method further includes receiving user input comprising a request to deploy a private mobile network. The user input further includes a selection of at least one virtualized network function (VNF) for implementing a packet core for the private mobile network. The at least one VNF is selected from the resources provided by the plurality of third-party vendors through the mobile connectivity service. The method further includes deploying the packet core for the private mobile network using the at least one VNF. The method further includes representing the private mobile network as a private mobile network logical entity in a database that is utilized by the mobile connectivity service. The method further includes monitoring performance of the at least one VNF. The method further includes associating VNF performance information with the private mobile network logical entity in the database. The method further includes providing the VNF performance information in response to queries about the performance of the private mobile network.

Deploying the packet core may include allocating computing resources within the cloud computing system for running the at least one VNF.

Deploying the packet core may include causing the at least one VNF to be sent to at least one of an on-premises network that is distinct from the cloud computing system, a colocation center, a public cloud provider, or an edge location of a telecommunication company.

Deploying the packet core may include allocating computing resources within the cloud computing system for running a first set of VNFs that implement a first portion of the packet core and causing a second set of VNFs that implement a second portion of the packet core to be sent to at least one of an on-premises network that is distinct from the cloud computing system, a colocation center, a public cloud provider, or an edge location of a telecommunication company.

The user input may further include a selection of at least one physical resource for the private mobile network. The at least one physical resource may be selected from the resources provided by the plurality of third-party vendors through the mobile connectivity service. The method may further include monitoring performance of the at least one physical resource, associating physical resource performance information with the private mobile network logical entity in the database, and providing the physical resource performance information in response to the queries about the performance of the private mobile network.

The at least one physical resource may include a base station for implementing a radio access network for the private mobile network.

The private mobile network logical entity may include a plurality of virtual resource logical entities. Each virtual resource logical entity may represent a virtual resource that implements the private mobile network. The private mobile network logical entity may also include a plurality of physical resource logical entities. Each physical resource logical entity may represent a physical resource that implements the private mobile network.

In accordance with another aspect of the present disclosure, a system is disclosed for providing a mobile connectivity service for a cloud computing system. The system includes one or more processors, memory in electronic communication with the one or more processors, and a user interface stored in the memory. The user interface enables users of the cloud computing system to interact with the mobile connectivity service. The system also includes a vendor application programming interface (API) stored in the memory. The vendor API facilitates interaction between the mobile connectivity service and a plurality of third-party vendors that provide resources for implementing private mobile networks. The system also includes a database stored in the memory. The database includes information about the resources provided by the plurality of third-party vendors. The database also includes a private mobile network logical entity representing a private mobile network that is deployed for a user of the cloud computing system. The system also includes instructions stored in the memory. The instructions may be executable by the one or more processors to receive, via the user interface, user input including a request to deploy the private mobile network. The user input further includes a selection of at least one virtualized network function (VNF) for implementing a packet core for the private mobile network. The at least one VNF may be selected from the resources provided by the plurality of third-party vendors through the mobile connectivity service. The instructions may also be executable by the one or more processors to deploy the packet core for the private mobile network using the at least one VNF. The instructions may also be executable by the one or more processors to monitor performance of the at least one VNF. The instructions may also be executable by the one or more processors to associate VNF performance information with the private mobile network logical entity in the database. The instructions may also be executable by the one or more processors to provide the VNF performance information in response to queries about the performance of the at least one VNF.

The memory may further include a plurality of control plane VNFs that are configured to implement at least a portion of a control plane for a packet core corresponding to the private mobile network and a plurality of user plane VNFs that are configured to implement at least a portion of a user plane for the packet core corresponding to the private mobile network.

Deploying the packet core may include allocating computing resources within the cloud computing system for running the at least one VNF.

Deploying the packet core may include causing the at least one VNF to be sent to at least one of an on-premises network that is distinct from the cloud computing system, a colocation center, a public cloud provider, or an edge location of a telecommunication company.

Deploying the packet core may include allocating computing resources within the cloud computing system for running a first set of VNFs that implement a first portion of the packet core an causing a second set of VNFs that implement a second portion of the packet core to be sent to at least one of an on-premises network that is distinct from the cloud computing system, a colocation center, a public cloud provider, or an edge location of a telecommunication company.

The private mobile network logical entity may include a plurality of virtual resource logical entities. Each virtual resource logical entity may represent a virtual resource that implements the private mobile network. The private mobile network logical entity may also include a plurality of physical resource logical entities, each physical resource logical entity representing a physical resource that implements the private mobile network.

The user input may further include a selection of at least one physical resource for the private mobile network. The at least one physical resource may be selected from the resources provided by the plurality of third-party vendors through the mobile connectivity service. The system may further include additional instructions stored in the memory. The additional instructions may be executable by the one or more processors to monitor performance of the at least one physical resource, associate physical resource performance information with the private mobile network logical entity in the database, and provide the physical resource performance information in response to the queries about the performance of the private mobile network.

The at least one physical resource may include a base station for implementing a radio access network for the private mobile network.

The vendor API may include onboarding tools that enable onboarding of the plurality of third-party vendors with the mobile connectivity service and management tools that enable the plurality of third-party vendors to perform management functions for the resources that are provided by the plurality of third-party vendors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

One aspect of the present disclosure is related to a cloud computing system that includes a managed networking service that enables users to consume managed virtualized network functions (VNFs) at edge locations. The cloud computing system can be operated by a cloud computing provider, and the managed VNFs can be provided by third-party vendors who are distinct from the cloud computing provider. A managed networking service in accordance with the present disclosure enables users to conveniently and easily deploy a plurality of VNFs from a plurality of different third-party vendors. The VNFs can be deployed as managed applications, so that the managed networking service automatically handles the management and maintenance of the VNFs. The managed networking service can also be configured to automatically chain the VNFs together to perform the desired networking functions. The managed networking service can also include end-to-end monitoring tools that enable users to monitor the performance of the managed VNFs that they have deployed.

The managed networking service can include a platform for onboarding VNFs from third-party vendors to the managed networking service. In other words, the managed networking service can include a mechanism for enabling third-party vendors to make their VNFs available to users of the cloud computing system through the managed networking service. The managed networking service can also include a mechanism for enabling third-party vendors to perform management functions with respect to their VNFs, such as managing the lifecycle of their VNFs.

A user of the managed networking service can consume any number of managed VNFs. In some cases, a user of the managed networking service can consume a plurality of managed VNFs, which can be provided by a plurality of different third-party vendors. A plurality of managed VNFs can be chained or combined together and used in sequence to perform one or more networking services.

The managed networking service can enable users to monitor the performance of the managed VNFs that they have consumed. Users can access information about the performance of their managed VNFs through the user interface of the managed networking service.

Figure 1:
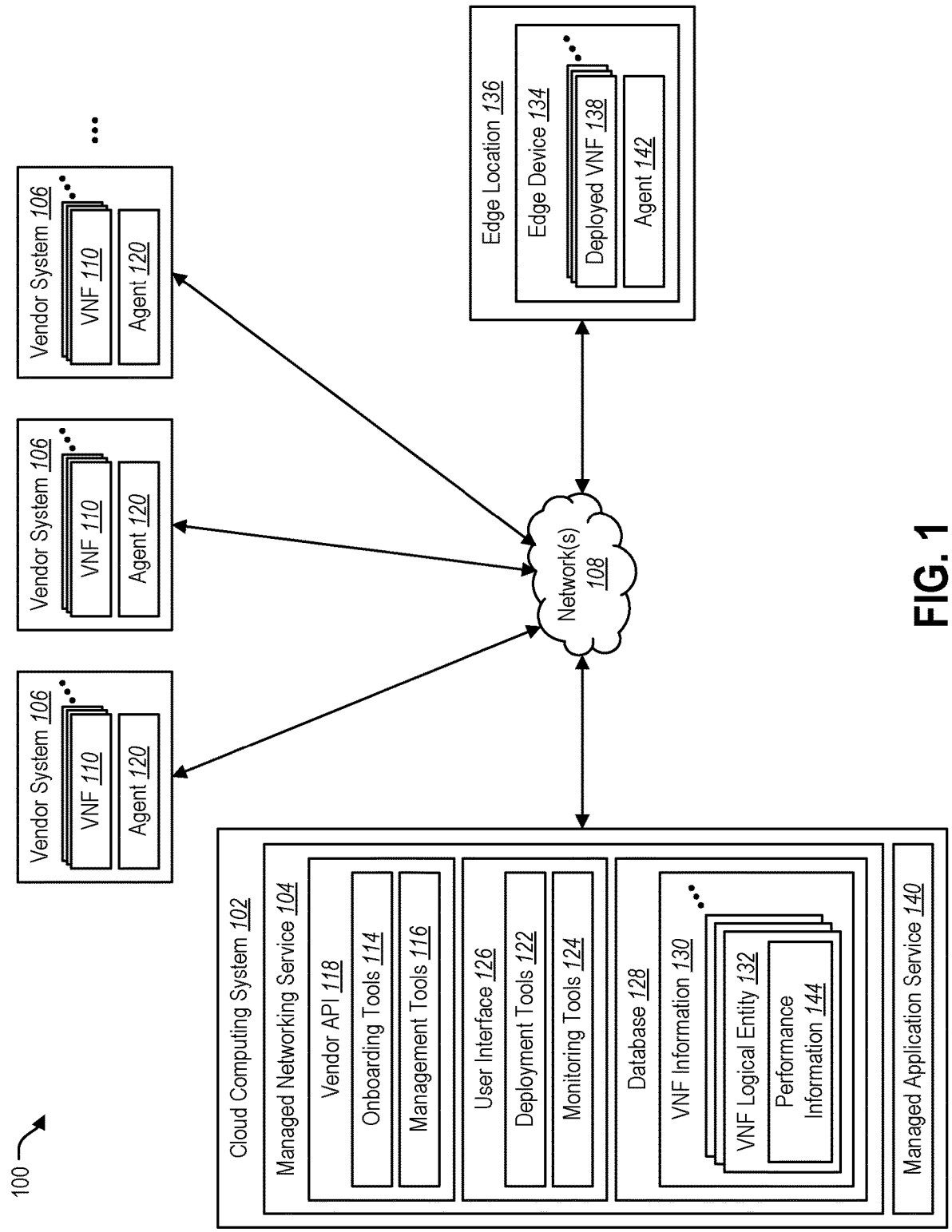
FIG. 1 illustrates an example of a system for providing a managed networking service for a cloud computing system in accordance with the present disclosure.

FIG. 1 illustrates an example of a system 100 for providing a managed networking service 104 for a cloud computing system 102 in accordance with the present disclosure.

The system 100 is shown with a plurality of computer systems corresponding to third-party vendors. These computer systems may be referred to herein as vendor systems 106. The vendor systems 106 are in electronic communication with the cloud computing system 102. Communication between the vendor systems 106 and the cloud computing system 102 can occur via one or more computer networks 108, which can include the Internet. Each vendor system 106 is shown with a plurality of VNFs 110 to indicate that the third-party vendors provide VNFs 110 for the managed networking service 104.

The managed networking service 104 enables third-party vendors to make their VNFs 110 available to users of the cloud computing system 102 through the managed networking service 104. This process can be referred to in general terms as onboarding, and the aspects of the managed networking service 104 that provide this functionality are represented in FIG. 1 as onboarding tools 114. Onboarding can include, among other things, registering the third-party vendors with the managed networking service 104 and determining information about the VNFs 110 that are going to be made available to users through the managed networking service 104.

The managed networking service 104 can also enable third-party vendors to perform management functions with respect to their VNFs 110. For example, the managed networking service 104 can enable third-party vendors to perform lifecycle management functions such as updating existing VNFs 110, releasing new VNFs 110, and retiring VNFs 110 that are no longer going to be supported. The aspects of the managed networking service 104 that enable third-party vendors to perform management functions with respect to their VNFs 110 are represented in FIG. 1 as management tools 116.

The onboarding tools 114 and the management tools 116 are shown as part of an application programming interface (API) that enables third-party vendors to interact with the managed networking service 104. This API may be referred to herein as a vendor API 118. The vendor systems 106 can include agents 120 that interact with the managed networking service 104 through the vendor API 118.

The managed networking service 104 can enable users to deploy VNFs 110 that are provided by the third-party vendors. The VNFs 110 can be deployed on the cloud computing system 102 (e.g., in virtual machines) and/or at edge locations. The aspects of the managed networking service 104 that enable users to deploy VNFs 110 are represented in FIG. 1 as deployment tools 122.

The managed networking service 104 can also enable users to monitor the performance of the VNFs 110 that they have deployed. The aspects of the managed networking service 104 that provide this functionality are represented in FIG. 1 as monitoring tools 124.

The deployment tools 122 and monitoring tools 124 are shown as part of a user interface 126 that enables users of the cloud computing system 102 to interact with the managed networking service 104. In some embodiments, the user interface 126 can be web-based. For example, the user interface 126 can be provided via one or more web pages, which can be viewed through a web browser running on a computing device.

FIG. 1 shows a database 128 associated with the managed networking service 104. The database 128 includes information about VNFs 110 that are provided by the third-party vendors. This information may be referred to herein as VNF information 130. The VNF information 130 can be presented to users, via the user interface 126, in order to inform the users about the VNFs 110 that are available through the managed networking service 104.

FIG. 1 also shows an edge device 134 deployed at an edge location 136. The edge device 134 is a computing device. The edge device 134 can be in electronic communication with the cloud computing system 102 via one or more computer networks 108, which may include the Internet.

A plurality of deployed VNFs 138 are shown on the edge device 134. A deployed VNF 138 represents a VNF 110 from a third-party vendor that has been deployed by a user of the managed networking service 104. The plurality of deployed VNFs 138 shown on the edge device 134 can be from the same vendor or from a plurality of different vendors.

In some embodiments, VNFs 110 can be deployed as managed applications. For example, the provider of the cloud computing system 102 (or another entity who works with the provider of the cloud computing system 102) can provide a managed application service 140. In general terms, a managed application service 140 provides an efficient way for third-party vendors to provide software applications to users of the cloud computing system 102. Advantageously, users are not required to maintain, update, or service applications that are deployed through the managed application service 140. Instead, the third-party vendors can manage and support the software applications that have been deployed. Thus, in some embodiments, third-party vendors who want to make their VNFs 110 available to users of the managed networking service 104 can publish their VNFs 110 as managed applications through the managed application service 140. When a user of the managed networking service 104 deploys a VNF 110 from a third-party vendor, the deployed VNF 138 can be provided as a managed application through the managed application service 140.

When a user of the cloud computing system 102 deploys a VNF 110 through the managed networking service 104, the VNF 110 can be represented as a logical entity in the database 128 that is utilized by the managed networking service 104. A logical entity that represents a deployed VNF 138 can be referred to herein as a VNF logical entity 132. FIG. 1 shows the database 128 with a plurality of VNF logical entities 132 corresponding to a plurality of deployed VNFs 138 that have been deployed by users of the managed networking service 104.

Representing a deployed VNF 138 as a VNF logical entity 132 in the database 128 allows users to perform various actions, such as utilizing the monitoring tools 124 of the managed networking service 104 to obtain information about the performance of the deployed VNFs 138. For example, monitoring tools 124 within the managed networking service 104 can communicate with agents 142 running on edge devices 134 to determine information about the performance of the deployed VNFs 138. The performance information 144 related to a particular deployed VNF 138 can be associated with the corresponding VNF logical entity 132 in the database 128. This enables a user that has deployed a VNF 110 to obtain information from the managed networking service 104 (e.g., via the user interface 126) about the performance of the deployed VNF 138. In response to a request for such information, the managed networking service 104 can provide the user with the performance information 144 that is associated with the corresponding VNF logical entity 132 in the database 128.

Figure 2:
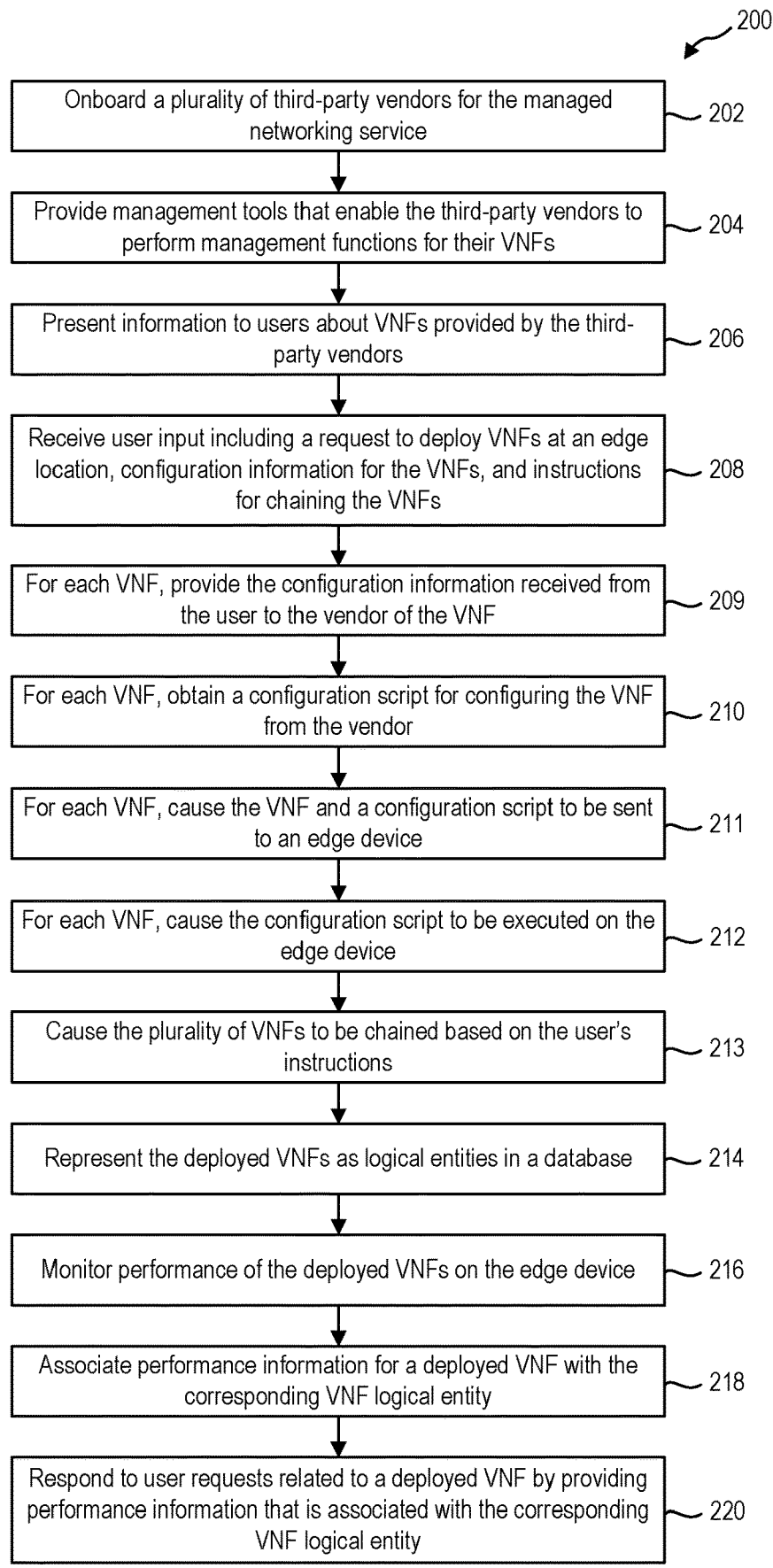
FIG. 2 illustrates an example of a method that can be performed by a managed networking service in accordance with the present disclosure.

FIG. 2 illustrates an example of a method 200 that can be performed by a managed networking service 104 in accordance with the present disclosure. For the sake of clarity, the method 200 will be described in relation to the system 100 shown in FIG. 1.

The method 200 can include onboarding 202 a plurality of third-party vendors for the managed networking service 104. The plurality of third-party vendors can provide a plurality of VNFs 110 for the managed networking service 104. The process of onboarding a third-party vendor can include obtaining information from the third-party vendor about one or more VNFs 110 that are being provided by that third-party vendor. As part of the onboarding process, agents 120 on vendor systems 106 can communicate with the managed networking service 104 via the vendor API 118. The method 200 can also include providing 204 management tools 116 that enable the third-party vendors to perform management functions (e.g., lifecycle management functions) for their VNFs 110.

When a user of the managed networking service 104 wants to deploy one or more VNFs 110, the user can access information about available VNFs 110 through the user interface 126 of the managed networking service 104. A user can then select one or more VNFs 110 to be deployed based on the information that is presented. Thus, the method 200 can include presenting 206, via the user interface 126 of the managed networking service 104, information to users about the VNFs 110 provided by the third-party vendors. The method 200 can also include receiving 208, via the user interface 126 of the managed networking service 104, user input from a user of the managed networking service 104. For the sake of simplicity in connection with discussing the present method 200, it will be assumed that the user input includes a request to deploy a plurality of VNFs 110 at an edge location 136. However, many other scenarios are possible in accordance with the present disclosure. For example, a user can submit a request to deploy just one VNF 110. As another example, a user can submit a request to deploy a plurality of VNFs 110, some of which can be deployed within the cloud computing system 102 itself (e.g., on a virtual machine that is running on the cloud computing system 102) and some of which can be deployed an edge location 136. As another example, a user can submit a request to deploy a plurality of VNFs 110 at a plurality of different edge locations 136.

In a scenario where the user has requested a plurality of VNFs 110 to be deployed at an edge location 136, the user input can also include information that is needed for configuration of the VNFs 110. For example, if a particular VNF 110 requires one or more IP addresses, then the user input can also include those IP addresses.

The user input can also include instructions for chaining the plurality of VNFs 110. For example, the user input can specify that the plurality of VNFs 110 should be used in a particular sequence in order to perform one or more networking-related functions.

For each VNF 110 that has been requested for deployment by the user, the managed networking service 104 can provide 209 the configuration information received from the user to the vendor of the VNF 110. The managed networking service 104 can also obtain 210, from the vendor, a configuration script for configuring the VNF 110. The vendor can use the configuration information provided by the user when creating the configuration script.

For each VNF 110 that has been requested for deployment by the user, the managed networking service 104 can cause 211 the VNF 110 to be sent to an edge device 134 that is located at the edge location 136. The managed networking service 104 can also cause 211 the configuration script that was obtained from the vendor to be sent to, and executed on, the edge device 134.

The managed networking service 104 can also cause 213 the plurality of deployed VNFs 138 to be chained based on the user's instructions. For example, the managed networking service 104 can send one or more commands to an agent 142 that is running on the edge device 134. The command(s) can cause the agent 142 to configure the edge device 134 so that the deployed VNFs 138 are performed in the sequence that is specified by the user.

The managed networking service 104 can represent 214 the deployed VNFs 138 as VNF logical entities 132 in a database 128 that is utilized by the managed networking service 104. This allows the user to utilize the monitoring tools 124 of the managed networking service 104 to obtain information about the performance of the deployed VNFs 138 at the edge location 136. Advantageously, such information can be obtained through the user interface 126 of the managed networking service 104.

The method 200 can include monitoring 216 performance of the deployed VNFs 138 on the edge device 134. For example, monitoring tools 124 within the managed networking service 104 can communicate with an agent 142 running on the edge device 134 to determine performance information 144 related to the deployed VNFs 138 on the edge device 134. The performance information 144 related to a particular deployed VNF 138 can be associated 218 with the corresponding VNF logical entity 132 in the database 128.

The method 200 can also include notifying the user about the performance of the VNFs 110 on the edge device 134. For example, the method 200 can include responding 220 to user requests related to a particular deployed VNF 138 by providing the performance information 144 that is associated with the corresponding VNF logical entity 132 in the database 128. Thus, the managed networking service 104 enables users to obtain information from the managed networking service 104 (e.g., via the user interface 126) about the performance of deployed VNFs 138.

Another aspect of the present disclosure is generally related to a service that enables users to set up and run a private mobile network. This type of service may be referred to herein as a mobile connectivity service. A mobile connectivity service, as disclosed herein, can be considered to be one specific implementation of the managed networking service discussed previously.

A mobile network (which may also be referred to as a cellular network) is a communication network where the last link is wireless. A typical mobile network includes a large number of overlapping geographic areas, or cells, each of which is served by one or more base stations. Mobile devices connect to a mobile network via a radio link to a base station. Base stations are connected to a core network, which facilitates circuit-switched voice communications between mobile devices and with telephones in the wider public switched telephone network (PSTN). Base stations are also connected to a packet switched network, which enables data packets to be sent to and received from external networks such as the Internet. Major telecommunications providers have deployed voice and data mobile networks in many areas throughout the world.

A Mobile Network Operator (MNO) is an entity that provides wireless communications services. MNOs typically own or control all the infrastructure elements necessary to host and manage wireless communications for subscribed users. MNOs may also be referred to as wireless service providers, wireless carriers, and/or mobile network carriers.

Traditionally, mobile networks are created and offered by MNOs. This is largely due to the complexity of spectrum licensing and the large capital expenditures that are required to set up a large-scale network. Mobile networks provided by MNOs can provide nationwide (or even international) connectivity, which is desirable in many consumer and enterprise scenarios.

Some recent developments, however, have created a market for private mobile networks, especially in the enterprise space. One such development is the virtualization of the packet core. Another development is the availability of shared and unlicensed spectrum that has become usable via recent government regulations. An example of this is the Citizens Broadband Radio Service (CBRS) in the United States. These changes can mitigate the complexity of spectrum licensing and the capital expenditure requirements for many enterprise scenarios.

A private mobile network can be operated only for a single entity. For example, a company named Contoso could have a private mobile network called "Contoso Network" that can be accessed only by devices that are configured for it. Access to this private mobile network can be restricted to individuals who are associated with Contoso (e.g., employees, customers).

A private mobile network uses a combination of various technologies, including core aspects such as cellular frequency, identity, radio access network, and packet core, as well as supplementary aspects such as VNF infrastructure, routing, hybrid connectivity, and monitoring. A mobile connectivity service in accordance with the present disclosure can provide a mechanism for entities who specialize in each of these technologies to sell their offerings to customers on the public cloud. Managing traditional mobile networks is difficult and is often done by dedicated support and network operation centers (NOCs). A mobile connectivity service as disclosed herein can simplify the setup and management of mobile networks similar to other cloud network resources like virtual networks. A mobile connectivity service can simplify mobile networks through a programmable resource model that can be provisioned and managed by end users. A mobile connectivity service can also augment customer experience via an end-to-end management and monitoring experience. A mobile connectivity service can provide a consistent operational experience through familiar cloud monitoring and alerting tools for mobile networks running on premise or at the edge. Thus, a mobile connectivity service can simplify the management and creation of private mobile networks.

An entity that provides the mobile connectivity service can be thought of as a connectivity broker. The connectivity broker can partner with other entities that provide other services and equipment for implementing the private mobile network. The connectivity broker can also provide a portal (e.g., a website) through which a user can create and manage a private mobile network. Through the portal, a user can select services and equipment provided by partners of the connectivity broker.

The connectivity broker can operate a cloud computing system (which may be a public cloud computing system), and the cloud computing system can implement aspects of the private mobile networks that are created for users. For example, some or all of a packet core of a private mobile network can be implemented in a cloud computing system that is provided by the connectivity broker.

Different types of deployment models can be made available for creating a private mobile network. The different types of deployment models can vary based on the location of components of the packet core technology. In some embodiments, at least three different deployment models can be made available: a cloud deployment model, a user-selected location deployment model, and a hybrid deployment model. In the cloud deployment model, the entire packet core (including the user plane and the control plane) can be hosted on the cloud computing system that provides the mobile connectivity service. In the user-selected location deployment model, the entire packet core can be deployed at one or more locations that are selected by the user. The user-selected locations can be, for example, an on-premises network, a colocation center, a peering location, an edge location of a public cloud provider (e.g., where content delivery network and other caching services are provided), an edge location of a telecommunication company, and combinations thereof. In the hybrid deployment model, some aspects of the packet core can be hosted on a cloud computing system that provides the mobile connectivity service, while other aspects of the packet core can be deployed at one or more user-selected locations.

Figure 3:
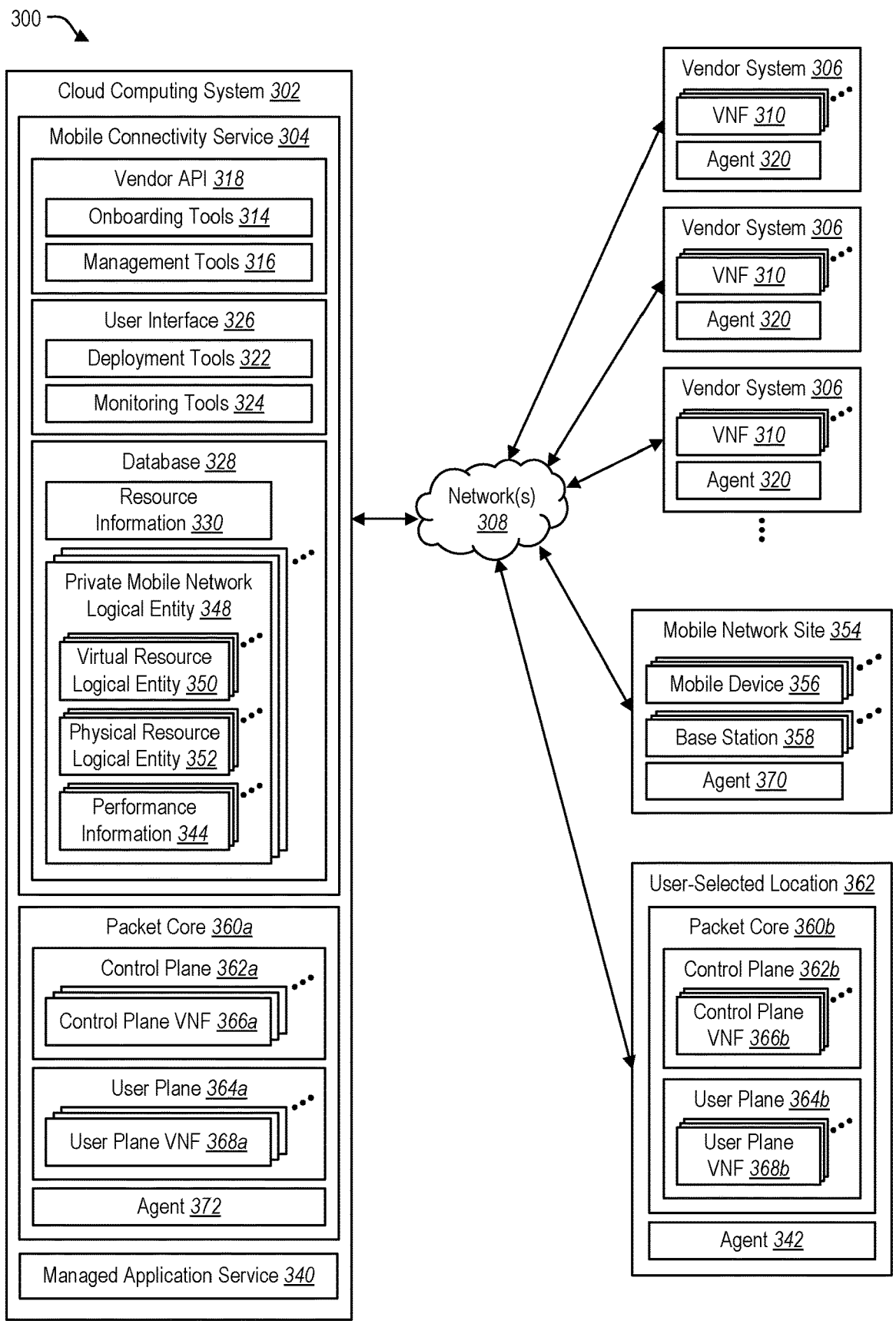
FIG. 3 illustrates an example of a system for providing a mobile connectivity service for a cloud computing system in accordance with the present disclosure.

FIG. 3 illustrates an example of a system 300 for providing a mobile connectivity service for a cloud computing system 302 in accordance with the present disclosure.

As in the system 100 shown in FIG. 1, the system 300 is shown with a plurality of vendor systems 306 representing computer systems that are utilized by third-party vendors. The vendor systems 306 can be in electronic communication with the cloud computing system 302 via one or more computer networks 308, which may include the Internet.

In general terms, the third-party vendors provide physical resources and/or virtual resources for implementing private mobile networks. Examples of physical resources include base stations. Examples of virtual resources include VNFs 310 that can be used to implement a packet core for a private mobile network. In FIG. 3, each vendor system 306 is shown with a plurality of VNFs 310 to indicate that the third-party vendors provide VNFs 310 for the mobile connectivity service 304.

The mobile connectivity service 304 includes several components that are similar to the corresponding components that were described above in connection with the managed networking service 104 shown in FIG. 1. For example, the mobile connectivity service 304 can include a vendor API 318 that enables third-party vendors to interact with the mobile connectivity service 304. The vendor systems 306 can include agents 320 that interact with the mobile connectivity service 304 through the vendor API 318. The vendor API 318 can include onboarding tools 314 that enable onboarding of third-party vendors with the mobile connectivity service 304. In other words, the onboarding tools 314 enable third-party vendors to make their virtual resources and physical resources available to users of the cloud computing system 302 through the mobile connectivity service 304. The vendor API 318 can also include management tools 316 that enable third-party vendors to perform management functions (e.g., lifecycle management functions) with respect to their virtual resources and physical resources. The mobile connectivity service 304 also includes a user interface 326 that enables users of the cloud computing system 302 to interact with the mobile connectivity service 304. The user interface 326 includes deployment tools 322 that enable users to deploy virtual resources and physical resources that are provided by the third-party vendors, and monitoring tools 324 that enable users to monitor the performance of the virtual resources and the physical resources that they have deployed.

In some embodiments, the virtual resources (e.g., VNFs) for implementing a private mobile network can be deployed as managed applications. The provider of the cloud computing system 302 (or another entity who works with the provider of the cloud computing system 302) can provide a managed application service 340. Third-party vendors who want to make their VNFs 310 available to users of the managed connectivity service 304 can publish their VNFs 310 as managed applications through the managed application service 340. When a user of the managed connectivity service 304 deploys VNFs 310 from a third-party vendor, the deployed VNFs (e.g., control plane VNFs 366a-b, user plane VNFs 368a-b) can be provided as managed applications through the managed application service 340.

FIG. 3 shows a database 328 associated with the mobile connectivity service 304. The database 328 includes information about virtual resources and physical resources that are provided by the third-party vendors. This information may be referred to herein as resource information 330. The resource information 330 can be presented to users, via the user interface 326, in order to inform the users about the virtual resources and the physical resources that are available from the third-party vendors through the mobile connectivity service 304.

When a user of the cloud computing system 302 deploys a private mobile network through the mobile connectivity service 304, the private mobile network can be represented as a logical entity in the database 328 that is utilized by the mobile connectivity service 304. A logical entity that represents a private mobile network can be referred to herein as a private mobile network logical entity 348. A private mobile network logical entity 348 can include one or more logical entities representing virtual resources that implement the private mobile network. Such logical entities may be referred to herein as virtual resource logical entities 350. A private mobile network logical entity 348 can also include one or more logical entities representing physical resources that implement the private mobile network. Such logical entities may be referred to herein as physical resource logical entities 352. FIG. 3 shows the database 328 with a plurality of private mobile network entities 348 corresponding to private mobile networks that have been deployed by users of the mobile connectivity service 304. Each private mobile network logical entity 348 is shown with a plurality of virtual resource logical entities 350 and a plurality of physical resource logical entities 352.

FIG. 3 also illustrates an example of a private mobile network that can be created using the mobile connectivity service 304. As shown, the radio access network portion of the private mobile network can be implemented at one or more mobile network sites. In this context, the term "mobile network site" can refer to a physical location where mobile devices can connect with a private mobile network via one or more base stations. A single mobile network site 354 is shown in FIG. 3, but a private mobile network in accordance with the present disclosure can be implemented across a plurality of mobile network sites 354.

The mobile network site 354 shown in FIG. 3 includes a plurality of mobile devices 356 and a plurality of base stations 358. An agent 370 is also shown at the mobile network site 354. The agent 370 and/or the base stations 358 at the mobile network site 354 can be in electronic communication with the cloud computing system 302 via one or more networks 308. Alternatively, the agent 370 and/or the base stations 358 can be in electronic communication with the cloud computing system 302 via another type of connectivity model such as a private virtual network (VPN). As another example, the agent 370 and/or the base stations 358 can be in electronic communication with the cloud computing system 302 via another service that makes it possible to create private connections between the mobile network site 354 and the cloud computing system 302.

As discussed above, different types of deployment models can be utilized for creating a private mobile network. The example shown in FIG. 3 illustrates a hybrid deployment model in which a first portion of the packet core 360a for the private mobile network is hosted by the cloud computing system 302 that provides the mobile connectivity service 304, and a second portion of the packet core 360b for the private mobile network is hosted at a user-selected location 362. Some examples of the user-selected location 362 were described above.

In general terms, the packet core 360 for a private mobile network includes a control plane and a user plane. One or more VNFs 310 from the third-party vendors can be utilized to implement the control plane, and one or more VNFs 310 from the third-party vendors can be utilized to implement the user plane. In the example shown in FIG. 3, a first portion of the control plane 362a and a first portion of the user plane 364a are hosted by the cloud computing system 302. The first portion of the control plane 362a includes a first set of control plane VNFs 366a, and the first portion of the user plane 364a includes a first set of user plane VNFs 368a. A second portion of the control plane 362b and a second portion of the user plane 364b are hosted at the user-selected location 362. The second portion of the control plane 362b includes a second set of control plane VNFs 366b, and the second portion of the user plane 364b includes a second set of user plane VNFs 368b.

The monitoring tools 324 within the mobile connectivity service 304 can communicate with one or more agents to determine performance information 344 related to the performance of the virtual resources and the physical resources that implement the private mobile network. FIG. 3 shows an agent 372 on the cloud computing system 302, an agent 342 at the user-selected location 362, and an agent 370 at the mobile network site 354. The monitoring tools 324 within the mobile connectivity service 304 can communicate with the various agents 372, 342, 370 on the cloud computing system 302 to determine performance information 344 related to the virtual resources and the physical resources that implement the private mobile network. This performance information 344 can be associated with the private mobile network logical entity 348 in the database 328 that is utilized by the mobile connectivity service 304.

Figure 4:
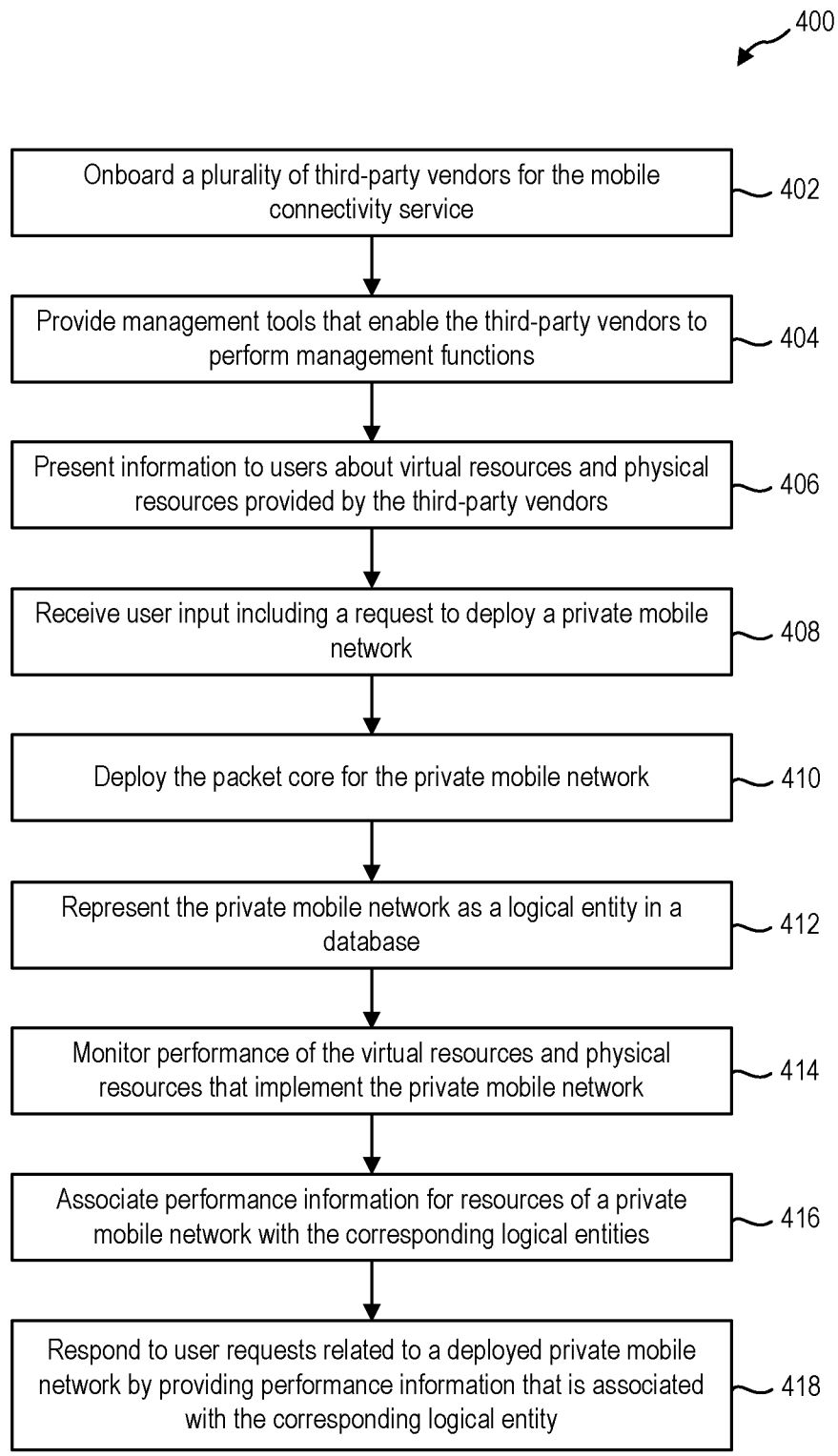
FIG. 4 illustrates an example of a method that can be performed by a mobile connectivity service in accordance with the present disclosure.

FIG. 4 illustrates an example of a method 400 that can be performed by a mobile connectivity service 304 in accordance with the present disclosure. For the sake of clarity, the method 400 will be described in relation to the system 300 shown in FIG. 3.

The method 400 can include onboarding 402 a plurality of third-party vendors for the mobile connectivity service 304. The plurality of third-party vendors can provide physical resources and/or virtual resources for implementing private mobile networks. The process of onboarding a third-party vendor can include obtaining information from the third-party vendor about one or more physical resources and/or virtual resources that are being provided by that third-party vendor. As part of the onboarding process, agents 320 on vendor systems 306 can communicate with the mobile connectivity service 304 via the vendor API 318. The method 400 can also include providing 404 management tools 316 that enable the third-party vendors to perform management functions (e.g., lifecycle management functions) for the physical resources and/or virtual resources that they provide.

When a user of the cloud computing system 302 wants to deploy a private mobile network, the user can access information about the virtual resources and the physical resources that are available through the mobile connectivity service 304 for implementing private mobile networks 308. Such information can be accessed through the user interface 326 of the mobile connectivity service 304. A user can then select virtual and physical resources for the private mobile network based on the information that is presented. Thus, the method 400 can include presenting 406, via the user interface 326 of the mobile connectivity service 304, information to users about the virtual and physical resources provided by the plurality of third-party vendors. The method 400 can also include receiving 408, via the user interface 326 of the mobile connectivity service 304, user input from a user of the cloud computing system 302. The user input can include a request to deploy a private mobile network. The user input can also include a selection of virtual resources and physical resources for implementing the private mobile network. For example, the user input can include a selection of VNFs 310 from third-party providers for implementing the packet core for the private mobile network. As another example, the user input can include a selection of one or more physical resources (e.g., base stations 358) for implementing the radio access network of the private mobile network.

In response to the user input, the mobile connectivity service 304 can deploy 410 the packet core for the private mobile network. For a cloud deployment model in which the entire packet core is hosted by the cloud computing system 302, deploying the packet core for the private mobile network can include allocating computing resources (e.g., virtual machines) within the cloud computing system 302 for running the VNFs that implement the packet core. For a user-selected location deployment model in which the entire packet core is deployed at one or more user-selected locations 362, deploying the packet core for the private mobile network can include causing the VNFs that implement the packet core to be sent to one or more user-selected locations 362. For a hybrid deployment model (as shown in FIG. 3) in which a first portion of the packet core 360a is hosted by the cloud computing system 302 and a second portion of the packet core 360b is deployed at one or more user-selected locations 362, deploying the packet core 360a-b for the private mobile network can include both allocating resources within the cloud computing system 302 for running the VNFs (e.g., control plane VNFs 366a and user plane VNFs 368a) that implement the first portion of the packet core 360a as well as causing the VNFs (e.g., control plane VNFs 366b and user plane VNFs 368b) that implement the second portion of the packet core 360b to be sent to one or more user-selected locations 362.

The mobile connectivity service 304 can represent 412 the private mobile network as a private mobile network logical entity 348 in a database 328 that is utilized by the mobile connectivity service 304. This allows the user that has deployed the private mobile network to perform various actions, such as utilizing the monitoring tools 324 of the mobile connectivity service 304 to obtain information about the performance of the virtual resources (e.g., control plane VNFs 366a-b and user plane VNFs 368a-b) and physical resources (e.g., base stations 358) that implement the private mobile network. Advantageously, such information can be obtained through the user interface 326 of the mobile connectivity service 304.

The method 400 can include monitoring 414, from the cloud computing system 302, the performance of the virtual resources (e.g., control plane VNFs 366a-b and user plane VNFs 368a-b) and physical resources (e.g., base stations 358) that implement the private mobile network. For example, monitoring tools 324 within the mobile connectivity service 304 can communicate with one or more agents 372 within the cloud computing system 302 to determine performance information 344 related to the VNFs (e.g., control plane VNFs 366a and user plane VNFs 368a) that are hosted by the cloud computing system 302. The monitoring tools 324 can also communicate with one or more agents 342 at one or more user-selected locations 362 to determine performance information 344 related to the VNFs (e.g., control plane VNFs 366b and user plane VNFs 368b) that have been deployed at the user-selected location(s) 362. The monitoring tools 324 can also communicate with one or more agents 370 at one or more mobile network sites 354 to determine performance information 344 related to the performance of physical resources (e.g., base stations 358) that implement the radio access network of the private mobile network. The performance information 344 that is determined in relation to virtual resources and physical resources can be associated 416 with the corresponding logical entities (e.g., virtual resource logical entities 350 and physical resource logical entities 352) in the database 328 that is utilized by the mobile connectivity service 304.

The method 400 can also include notifying users about the performance of private mobile networks that have been deployed. For example, the method 400 can include responding 418 to user requests related to a particular private mobile network that has been deployed by providing the performance information 344 that is associated with the corresponding private mobile network logical entity 348 in the database 328. Thus, the mobile connectivity service 304 enables users to obtain information (e.g., via the user interface 326) about the performance of private mobile networks that have been deployed.

Figure 5:
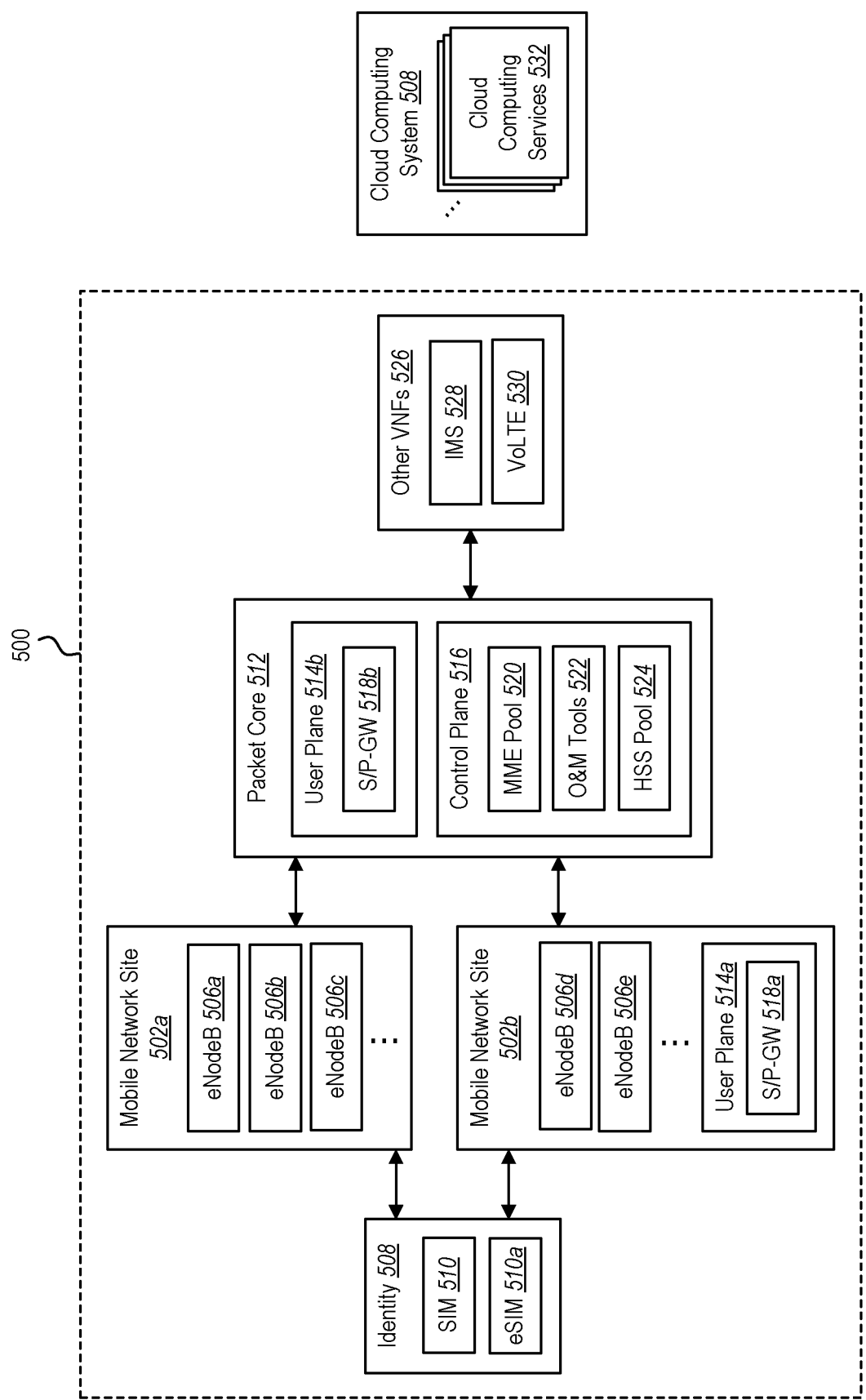
FIG. 5 illustrates an example of a mobile network that can be created through a mobile connectivity service in accordance with the present disclosure.

FIG. 5 illustrates an example of a mobile network 500 that can be created through a mobile connectivity service in accordance with the present disclosure. In the depicted example, it will be assumed that the mobile network 500 complies with the Long-Term Evolution (LTE) wireless communication standard. Thus, the mobile network 500 in FIG. 5 is shown with various LTE entities. However, the scope of the present disclosure is not limited to LTE standards. The techniques disclosed herein are applicable to any type of mobile network, including (but not limited to) mobile networks based on other types of wireless communications standards, such as 5G standards, Universal Mobile Telecommunications System (UMTS) standards, and/or Global System for Mobile Communications (GSM) standards. The techniques disclosed herein are not limited to cellular networks but are also applicable to mobile networks that operate in accordance with other access technologies, such as wireless local area network (WLAN) technologies that operate in accordance with an IEEE 802.11 standard (e.g., 802.11ax, also known as "WiFi 6").

The mobile network 500 includes a plurality of mobile network sites 502a-b. For simplicity, only two mobile network sites 502a-b are shown in the depicted mobile network 500. However, a mobile network in accordance with the present disclosure can include a different number of mobile network sites.

Both of the mobile network sites 502a-b include a plurality of base stations. In an LTE network, a base station is referred to as an Evolved Node B (which can be abbreviated as eNodeB or eNB). The first mobile network site 502a includes a plurality of eNBs 506a-c. The second mobile network site 502b includes a plurality of eNBs 506d-e.

The mobile network 500 is shown with an identity 507. The identity 507 represents information that can be uniquely associated with a person (or entity) that is authorized to access the mobile network 500. As an example, the identity 507 can include an international mobile subscriber identity (IMSI) number and its related key. The identity 507 can be stored in a subscriber identification module (SIM) card 510, which is an integrated circuit that can be used by a mobile device. Alternatively, the identity 507 can be represented as an electronic SIM (eSIM) 510a. The identity 507 can be used to identify and authenticate a mobile device that is attempting to connect to the mobile network 500.

The mobile network 500 is deployed in accordance with a cloud deployment model. Thus, some parts of the packet core 512 are deployed at a mobile network site, and some parts are deployed elsewhere. More specifically, the packet core 512 includes a user plane (including a first portion of the user plane 514a and a second portion of the user plane 514b) and a control plane 516. A first portion of the user plane 514a is implemented at the second mobile network site 502b. A second portion of the user plane 514b is implemented in another location that is separate from the mobile network sites 502a-b. For example, the second portion of the user plane 514b could be hosted on a cloud computing system 508.

The user plane 514a-b is shown with a gateway 518a-b. The gateway 518a-b is intended to represent a combination of a serving gateway and a packet data network gateway, and is abbreviated as S/P-GW. A first portion 518a of the S/P-GW is implemented in the first portion of the user plane 514a at the second mobile network site 502b. A second portion 518b of the S/P-GW is implemented in the second portion of the user plane 514b.

The control plane 516 is shown with a mobility management entity (MME) pool 520, operations and maintenance (O&M) tools 522, and a home subscriber server (HSS) pool 524.

The S/P-GW 518a-b, MME pool 520, O&M tools 522, and HSS pool 524 can be implemented as VNFs. Other VNFs 526 within the mobile network 500 include an Internet protocol (IP) multimedia subsystem (IMS) 528 and a voice over LTE (VoLTE) service 530.

A cloud computing system 508 that provides the mobile connectivity service can also provide a plurality of other cloud computing services 532 as well. The mobile connectivity service can be integrated with the other cloud computing services 532.

In an alternative embodiment, the entire packet core (including the user plane, the control plane, and virtual network functions such as IMS, VoLTE, etc.) can be implemented at one or more mobile network sites.

Figure 6:
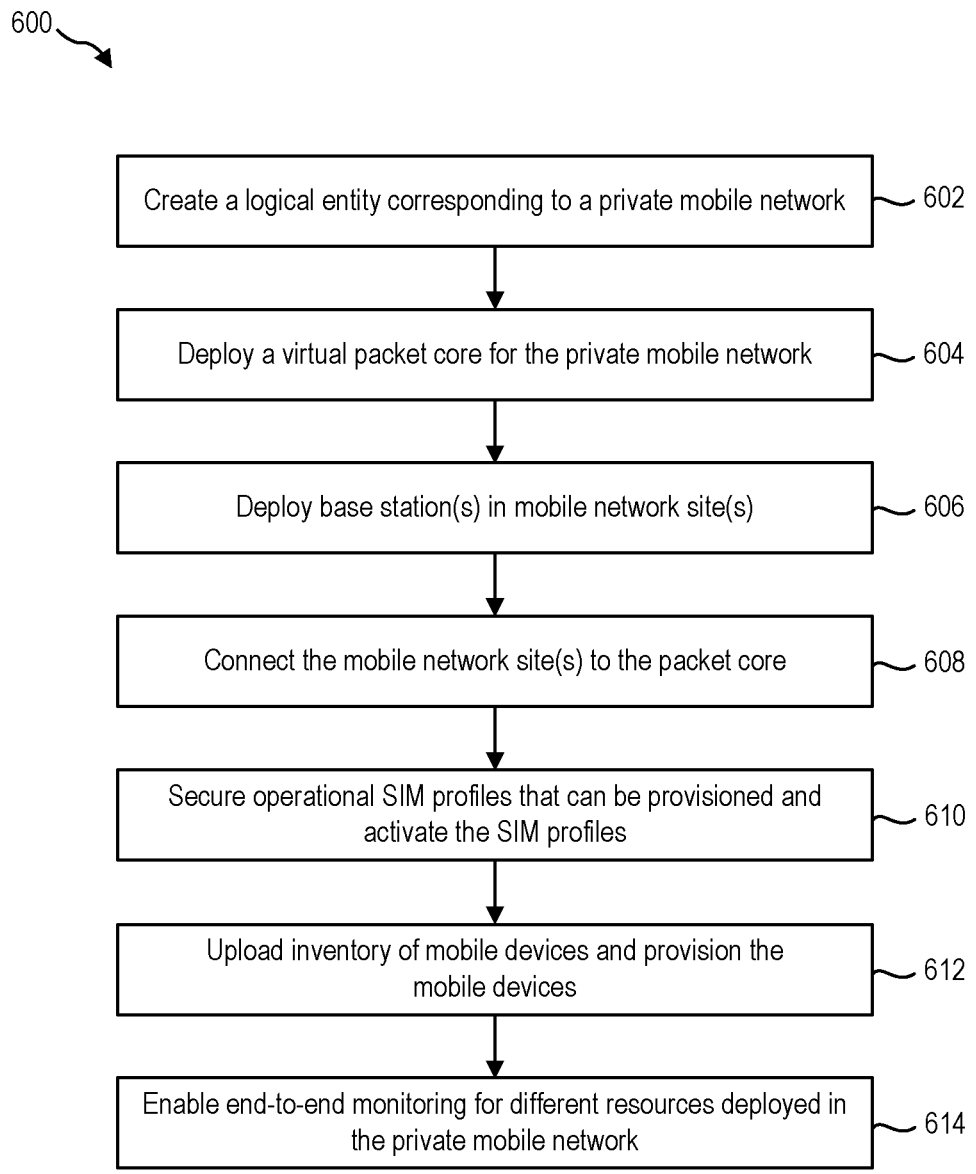
FIG. 6 illustrates an example of a method that illustrates how a user of a cloud computing system can utilize a mobile connectivity service to deploy a private mobile network.

FIG. 6 illustrates an example of a method 600 that illustrates how a user of a cloud computing system can utilize a mobile connectivity service to deploy a private mobile network.

In accordance with the method 600, a user can create 602 a logical entity corresponding to a private mobile network. An example of this type of logical entity is the private mobile network logical entity 348 that was discussed above in connection with the system 300 shown in FIG. 3.

The user can also deploy 604 a virtual packet core (e.g., the packet core 512 shown in FIG. 4) for the private mobile network. As indicated above, the entity that provides the mobile connectivity service can partner with other entities that provide the other services and equipment that are needed to implement the private mobile network. The user can work with one or more of these other entities to deploy the virtual packet core. The virtual packet core can be deployed in accordance with a cloud deployment model, a user-selected location deployment model, or a hybrid deployment model. For example, the user can choose to deploy the control plane components for the packet core in the cloud computing system, and to deploy the user plane components in the cloud computing system and/or at one or more other user-selected locations.

The method 600 can also include deploying 606 one or more base stations (e.g., eNBs 506a-e) in one or more mobile network sites (e.g., the mobile network sites 502a-b shown in FIG. 5). The user can register with a spectrum access system provider and upload the inventory of base stations to the database (e.g., the database 328 in the system 300 shown in FIG. 3) that includes the logical entity corresponding to the private mobile network.

The user can also connect 608 the mobile network site(s) to the virtual packet core. In some embodiments, the user can utilize a cloud computing service that is offered by the connectivity broker (or another entity that is partnered with the connectivity broker). For example, the user may utilize a virtual private network (VPN) service to connect 608 the mobile network site(s) to the packet core. Alternatively, the user may utilize another service that makes it possible to create private connections between datacenters utilized by the cloud computing system and infrastructure that is located elsewhere (e.g., at one or more user-selected locations).

The method 600 can also include securing 610 operational SIM profiles for mobile devices that are going to connect to the private mobile network. These SIM profiles can be either physical SIM profiles or eSIM profiles. The SIM profiles can be provisioned and activated, and the logical entity corresponding to the private mobile network (e.g., the private mobile network logical entity 348 in the system 300 of FIG. 3) can be updated to include the SIM profiles.

The inventory of mobile devices that are going to connect to the private mobile network can be uploaded 612 to the cloud computing system. Information about these mobile devices can be associated with the logical entity corresponding to the private mobile network (e.g., the private mobile network logical entity 348 in the system 300 of FIG. 3). In some embodiments, the mobile devices can include Internet of Things (IoT) devices. The IoT devices can be provisioned on another cloud computing service offered by the connectivity broker that is specifically designed for connecting IoT devices to the cloud. This illustrates how the mobile connectivity service can be integrated with other cloud computing services offered by the connectivity broker.

The method 600 can also include enabling 614 end-to-end monitoring for different resources that are deployed in the private mobile network. This enables the user to determine information about the resources that are deployed in the private mobile network through an interface (e.g., a web-based interface) that can be provided by the connectivity broker.

Figure 7A:
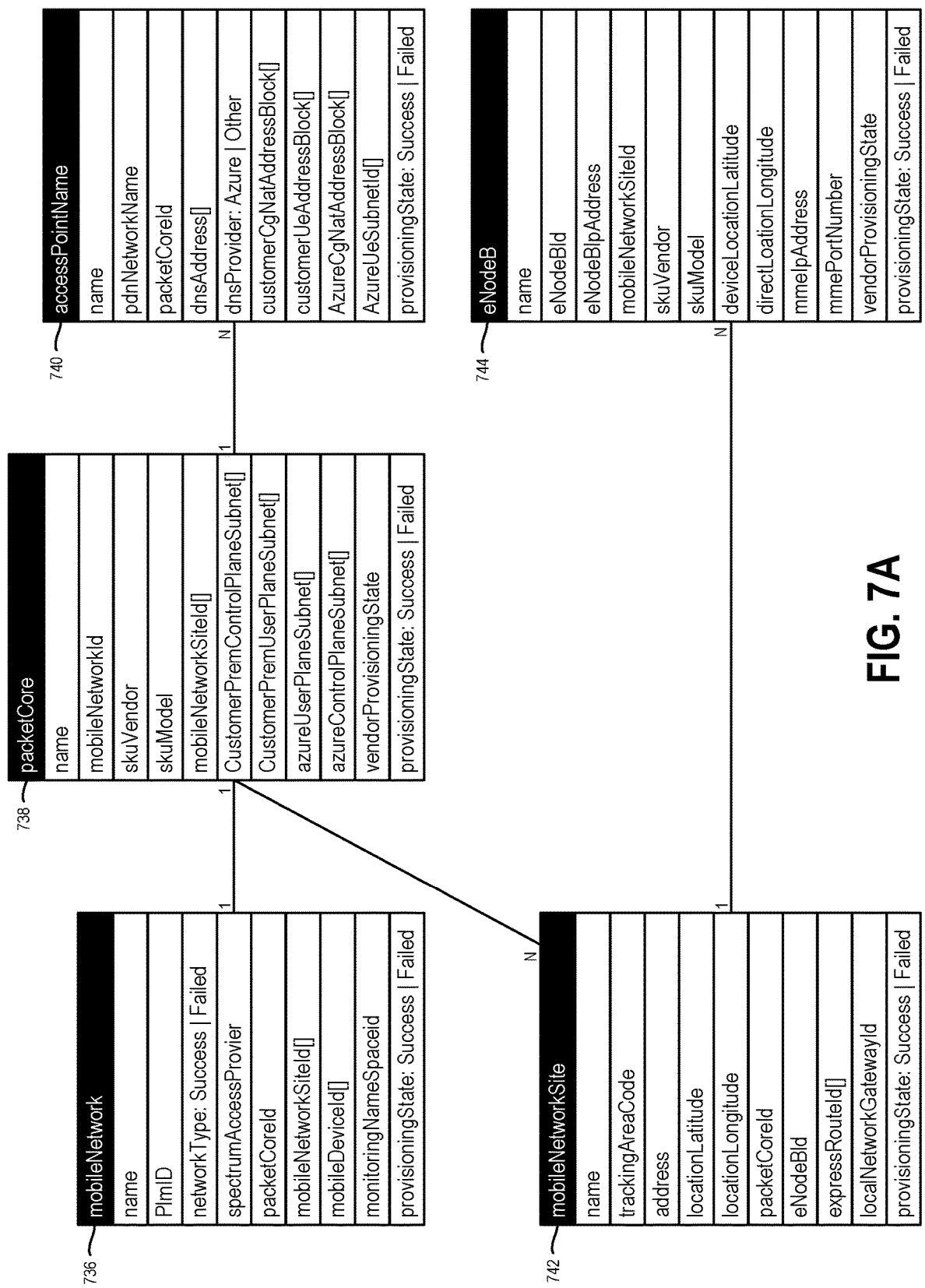
FIGS. 7A-C illustrate examples of various logical entities that can be created and maintained by a provider of a mobile connectivity service in connection with the deployment of a private mobile network.
Figure 7B:
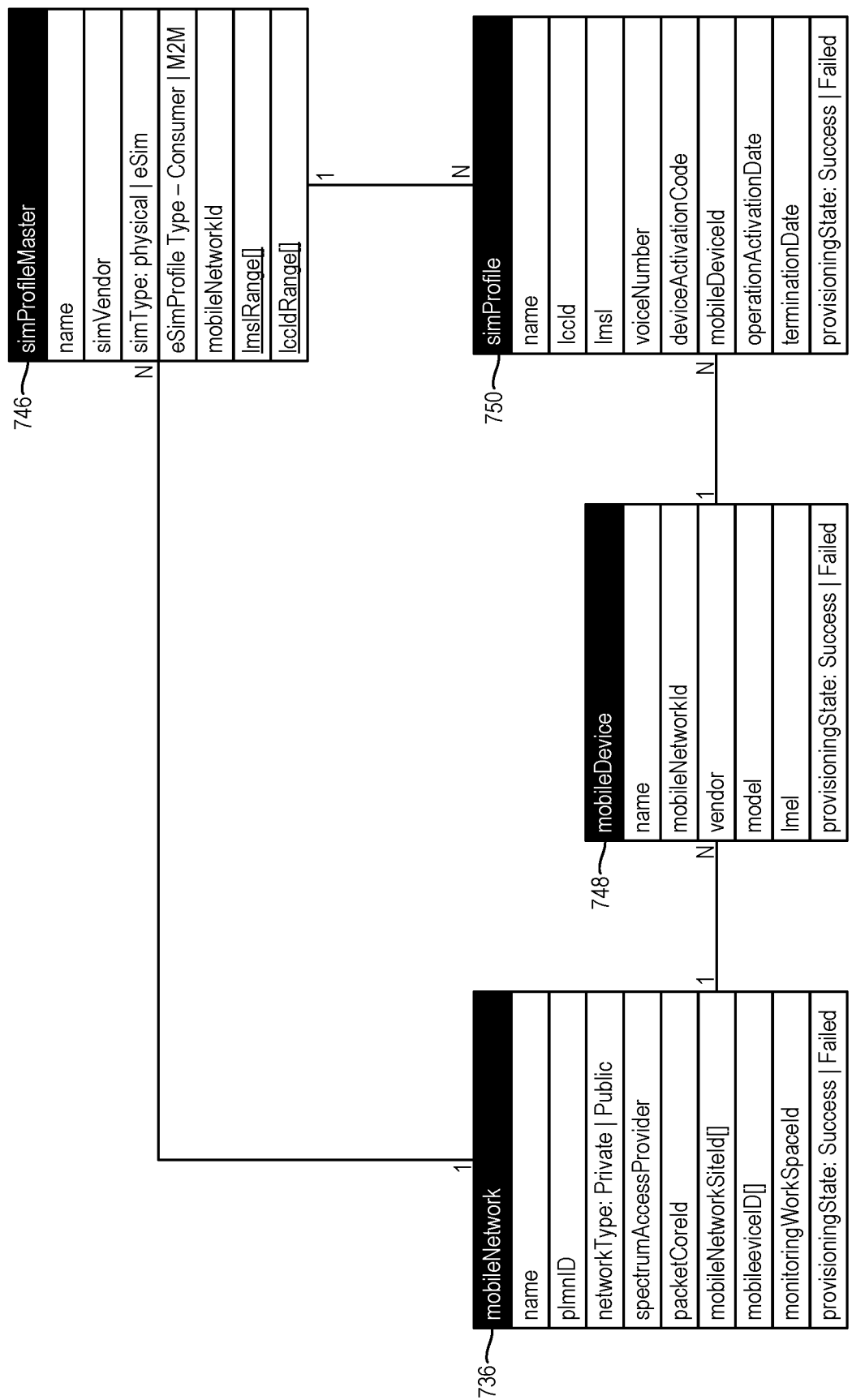
Figure 7C:
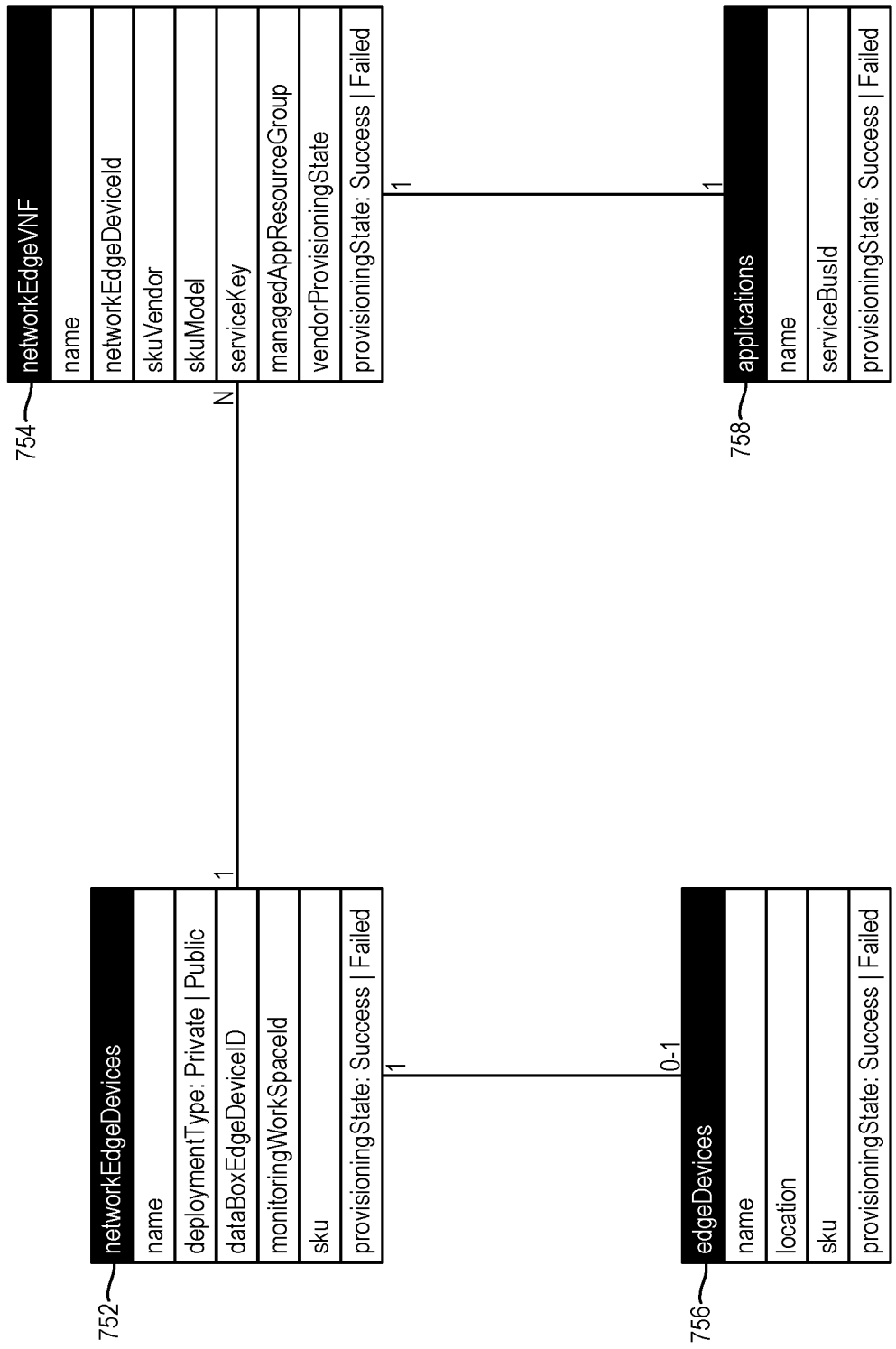

FIGS. 7A-C illustrate examples of various logical entities that can be created and maintained by a provider of a mobile connectivity service in connection with the deployment of a private mobile network. Various properties of the depicted logical entities are also shown in FIGS. 7A-C. The logical entities shown in FIGS. 7A-C represent examples of the virtual resource logical entities 350 and physical resource logical entities 352 shown in FIG. 3. In the examples shown in FIGS. 7A-C, the logical entities that represent virtual resources and physical resources are represented as data structures.

Referring initially to FIG. 7A, the mobile network data structure 736 is a container for all the data structures corresponding to the virtual and physical resources that are used to create a private mobile network using the mobile connectivity service. The mobile network data structure 736 includes one packet core data structure 738 with 1:N user plane data structures and 1:N control plane data structures. In other words, for every packet core data structure 738, there can be N user plane data structures and N control plane data structures, where N can be any positive integer.

The user plane data structure can include 1:N access point name data structures 740 that connect to different packet data resources.

The mobile network data structure 736 includes 1:N mobile network site data structures 742. Each mobile network site data structure 742 represents a location (e.g., a building or a complex) with connectivity to the packet core. As discussed above, if at least some aspects of the packet core are implemented in a cloud computing system that is operated by the mobile connectivity service provider, such connectivity can be provided by another cloud computing service (e.g., a VPN service) that is offered by the mobile connectivity service provider.

The mobile network site data structure 742 can include 1:N eNodeB data structures 744.

Referring now to FIG. 7B, the mobile network data structure 736 can include 1:N SIM profile master data structures 746, which can be different templates that are available to create operational SIM profiles. The mobile network data structure 736 can also include 1:N mobile device data structures 748 and 1:N SIM profile data structures 750. A mobile device can be activated on a private mobile network using a SIM profile data structure 750.

Referring now to FIG. 7C, the network edge devices data structure 752 is a container for all the network edge VNFs that have been deployed in connection with a private mobile network. Each network edge device data structure 752 contains 0:N network edge VNF data structures 754. A network edge VNF data structure 754 represents a VNF that is deployed on a network edge device corresponding to the network edge devices data structure 752. In some embodiments, each network edge VNF data structure 754 can be a managed application deployment. More specifically, the mobile connectivity service provider can also provide a managed application service (as discussed above), and each network edge VNF data structure 754 can be deployed as a managed application through the managed application service. The VNF publisher can fully manage the network edge VNF deployment.

FIG. 7C shows the network edge devices data structure 752 with an edge devices data structure 756. In addition, FIG. 7C also shows the network edge VNF data structure 754 with an applications data structure 758.

Figure 8:
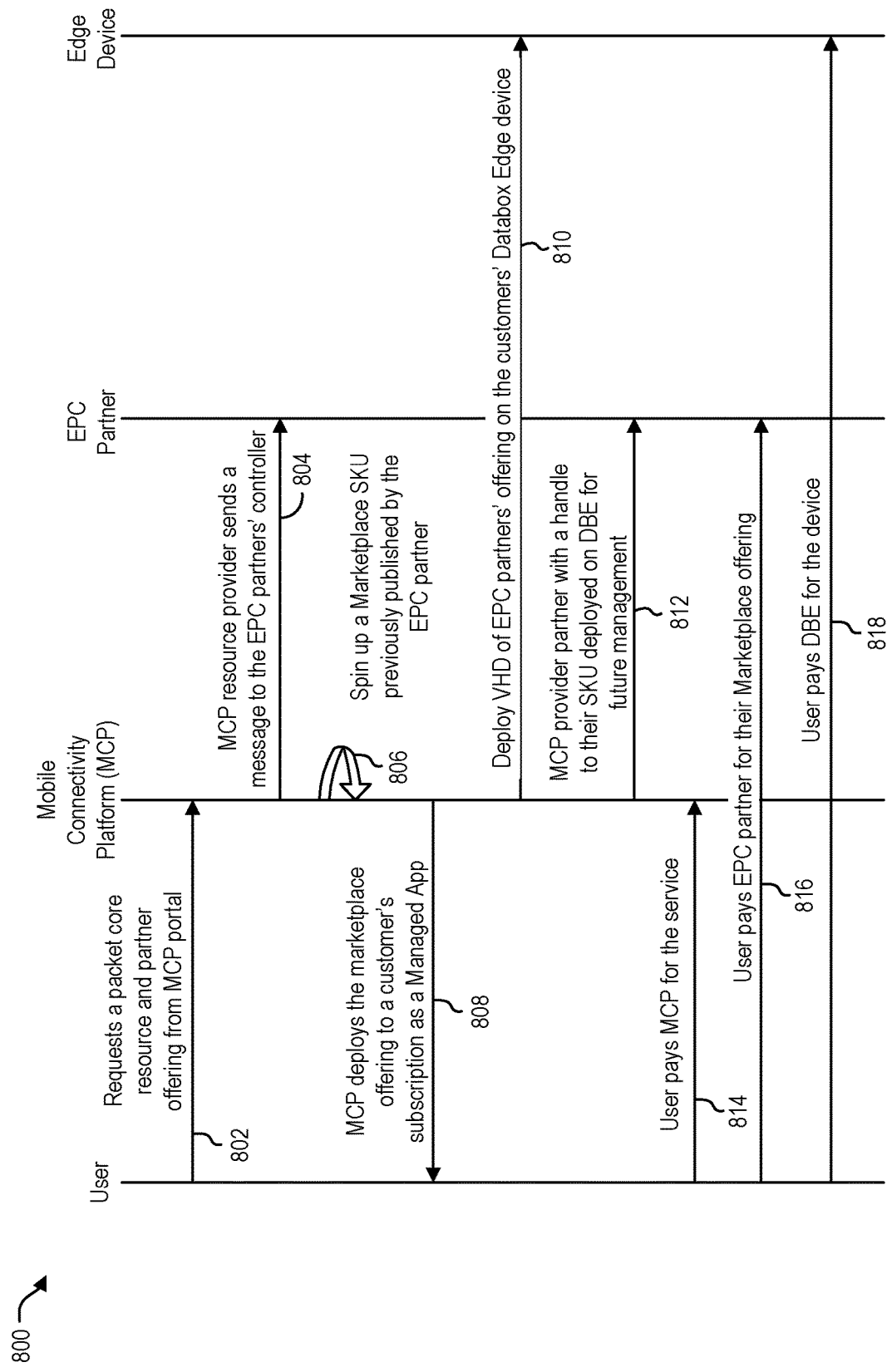
FIG. 8 illustrates an example of a method that illustrates how orchestration occurs between the mobile connectivity service provider and its partners in a scenario in which at least some aspects of the packet core are implemented in an edge device.

Another aspect of the present disclosure is related to the way in which VNF orchestration occurs between the mobile connectivity service provider and its partners (e.g., third-party vendors) who provide other services and equipment for implementing the private mobile network. FIG. 8 illustrates an example of a method 800 that illustrates such orchestration in a scenario in which at least some aspects of the packet core are implemented in an edge device (e.g., the edge device 134 shown in FIG. 1).

In FIG. 8, the various entities that are involved with the method 800 include a user of the mobile connectivity service, the mobile connectivity service provider itself, a partner of the mobile connectivity service provider (EPC partner), and an edge device. The mobile connectivity service provider is represented by a mobile connectivity platform (MCP). The partner of the mobile connectivity service provider is represented as an Evolved Packet Core (EPC) partner, which is an example of a packet core that can be implemented in a private mobile network (in particular, a private LTE network).

In accordance with the method 800, a user requests 802 a packet core resource and a partner offering from the MCP portal, which is an interface through which users can access the mobile connectivity service offered by the MCP. In some embodiments, the MCP portal can be part of a user interface 326 for the mobile connectivity service 304.

In response to receiving the request, the MCP resource provider sends 804 a message to the EPC partner's controller. In addition, the MCP spins up 806 a marketplace stock keeping unit (SKU) that was previously published by the EPC partner. The marketplace SKU represents an identifier corresponding to the service that the user selected when the user requested 802 the packet core resource.

The MCP can deploy 808 the marketplace offering to the user's subscription as a managed application. In addition, the MCP can deploy 810 the EPC partner's offering on an edge device corresponding to the user. The MCP provides 812 the EPC partner with a handle to the SKU that is deployed on the user's edge device for future management.

The user can provide payment to the various entities that are involved. In particular, the user can pay 814 the MCP for the service. The user can also pay 816 the EPC partner for their marketplace offering. The user can also pay 818 the edge device for the device.

Figure 9:
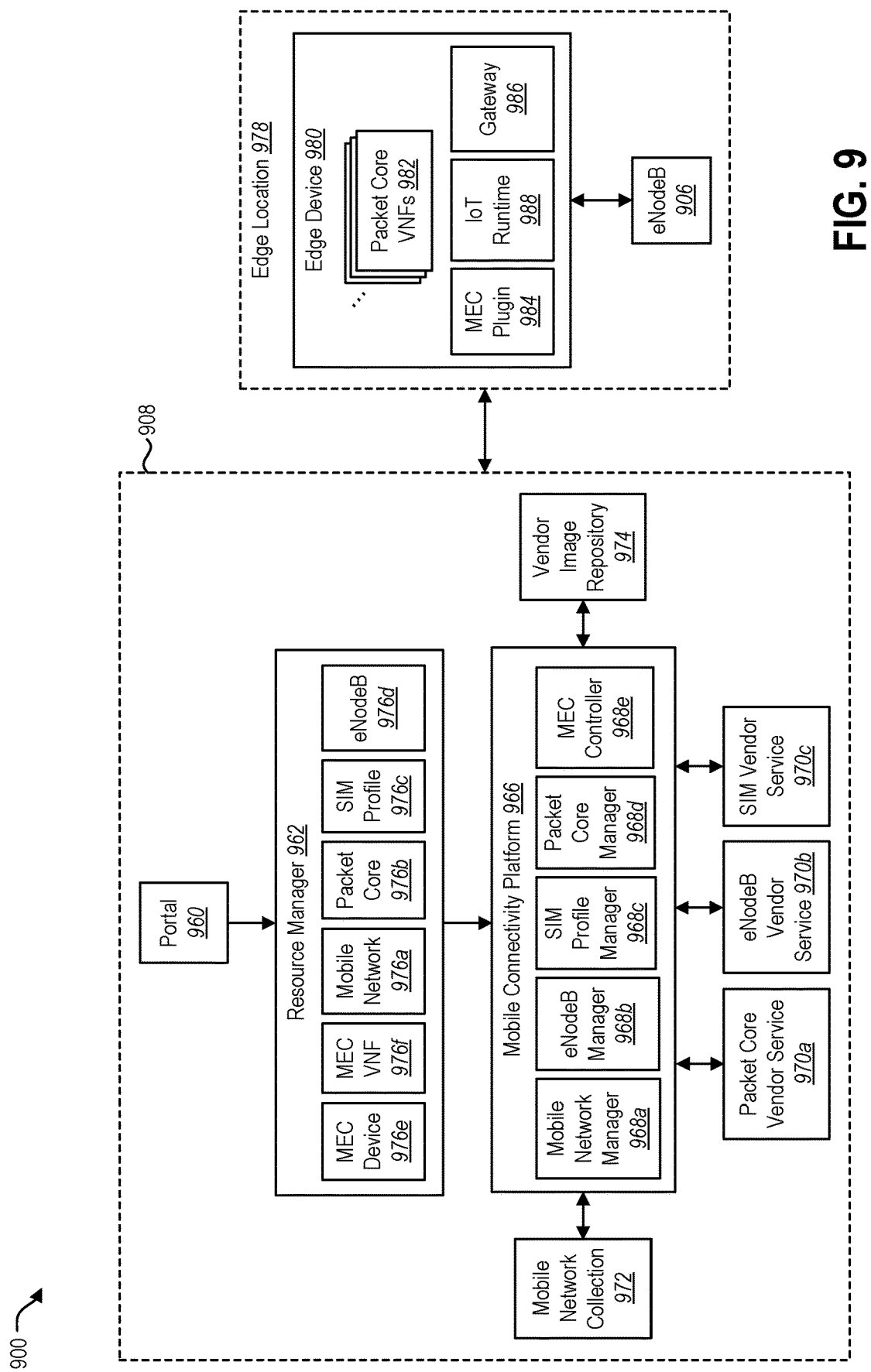
FIG. 9 illustrates an example of an architecture for a mobile connectivity service that can be used to create a private mobile network in accordance with the present disclosure.

FIG. 9 illustrates an example of an architecture 900 for a mobile connectivity service that can be used to create a private mobile network in accordance with the present disclosure. Certain components that implement the mobile connectivity service are provided via a cloud computing system 908. For example, the cloud computing system 908 can implement a mobile connectivity platform 966, which can include various components that perform management functions with respect to the mobile connectivity service. FIG. 9 shows the mobile connectivity platform 966 with a mobile network manager 968a, an eNodeB manager 968b, a SIM profile manager 968c, a packet core manager 968d, and a multi-access edge computing (MEC) controller 968e. The components within the mobile connectivity platform 966 are examples of the management tools 316 that were discussed above in connection with the system 300 shown in FIG. 3.

The MEC controller 968e enables MEC functionality to be implemented by the mobile connectivity service. MEC is a network architecture concept that enables cloud computing capabilities and an IT service environment at the edge of a mobile network. MEC is defined by the European Telecommunications Standards Institute (ETSI).

The mobile connectivity platform 966 can interact with various services that are provided by third-party vendors that have partnered with the provider of the mobile connectivity service. FIG. 9 shows three examples of these kinds of services, namely, a packet core vendor service 970a, an eNodeB vendor service 970b, and a SIM vendor service 970c.

FIG. 9 shows a mobile network collection 972, which is intended to represent different types of mobile networks that can be created and managed via the mobile connectivity platform 966. FIG. 9 also shows a vendor image repository 974, which can include executable files and other types of components for implementing services provided by third-party vendors.

As discussed above, setting up a private mobile network can include creating particular logical entities (e.g., a private mobile network logical entity 348, virtual resource logical entities 350, physical resource logical entities 352) that are associated with the private mobile network. A resource manager 962 within the cloud computing system 908 can be configured to keep track of all of the virtual resources and physical resources that are associated with a particular private mobile network. This can involve creating logical entities that represent the virtual resources and physical resources that implement the private mobile network. FIG.

9 shows several examples of logical entities that can be associated with a particular mobile network, including a mobile network logical entity 976a, a packet core logical entity 976b, a SIM profile logical entity 976c, an eNodeB logical entity 976d, a MEC device logical entity 976e, and a MEC VNF logical entity 976f. Examples of at least some of these types of logical entities were described above in connection with FIGS. 7A-C.

A user can access the mobile connectivity service via a portal 960 (e.g., a website). The portal 960 can be part of a user interface 326 for the mobile connectivity service. The user can access information about virtual resources and physical resources that are associated with a private mobile network by accessing the corresponding logical entities 976a-f via the resource manager 962.

As discussed above, implementation of a mobile connectivity service involves components at an edge location 978 of the private mobile network. Such components can include one or more base stations, such as the eNodeB 906 shown in FIG. 9, as well as one or more edge devices 980. At least some aspects of the packet core can be implemented on the edge device 980. For example, FIG. 9 shows a plurality of packet core VNFs 982 on the edge device 980. The edge device 980 is also shown with other components that facilitate management of the private mobile network, such as a MEC plugin 984 and a gateway 986. The databox edge device 980 can also include other types of services provided by the mobile connectivity service provider. An example of such a service is the IoT runtime service 988 shown in FIG. 9.

Communication between the edge device 980 and the eNodeB 906 can occur via a local area network (LAN) at the edge location 978. Communication between the components at the edge location 978 (including the edge device 980 and the eNodeB 906) and the mobile connectivity platform 966 can occur via a VPN, which can be provided by a VPN service of the mobile connectivity service provider.

Figure 10:
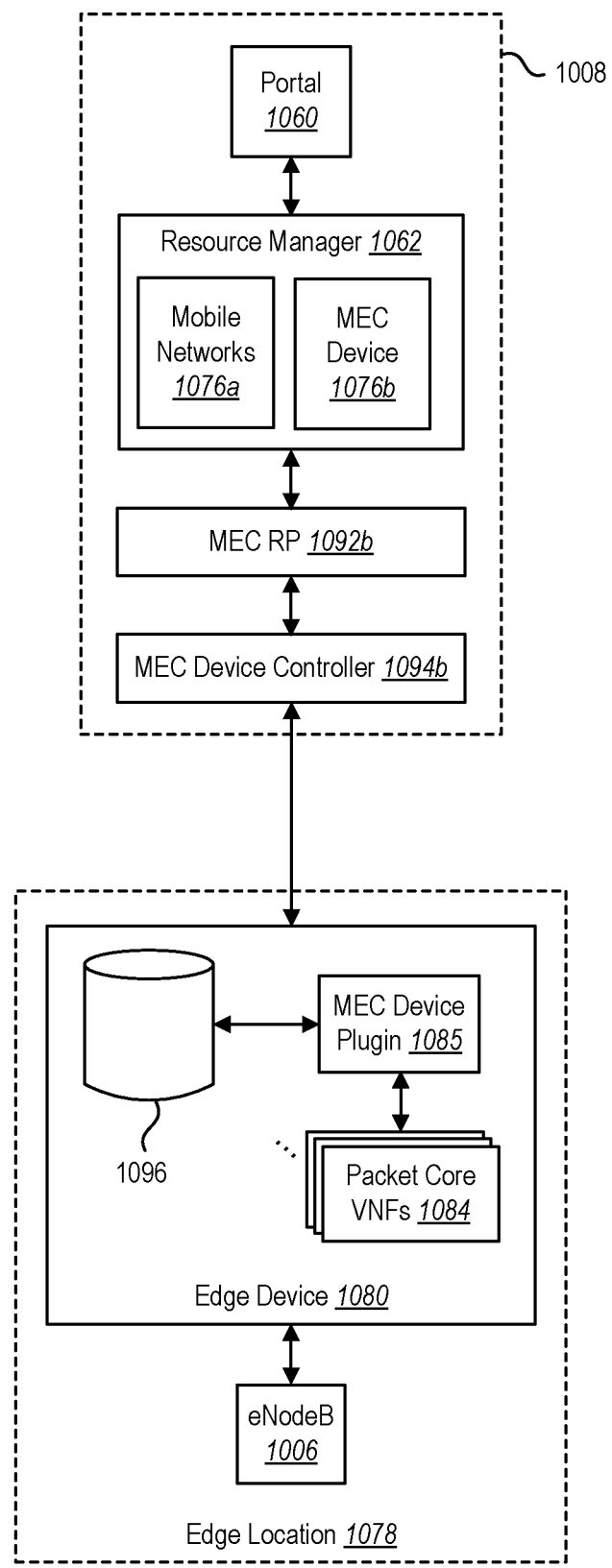
FIG. 10 illustrates an example showing how components within a mobile connectivity platform implemented by a cloud computing system can interact with components on an edge device.

FIG. 10 illustrates an example showing how components within a mobile connectivity platform implemented by a cloud computing system 1008 can interact with components on an edge device 1080. As indicated above, an edge device 1080 can be located at a user-selected location (e.g., the user-selected location 362 in the system 300 shown in FIG. 3).

A user can access the mobile connectivity service via a portal 1060 (e.g., a website). The user can access information about virtual resources and physical resources associated with a private mobile network via the resource manager 1062. The resource manager 1062 shown in FIG. 10 includes logical entities representing virtual resources and/or physical resources that implement the private mobile network. In particular, the resource manager 1062 is shown with a mobile network logical entity 1076a and a MEC device logical entity 1076b.

The mobile connectivity platform can include several components that are configured to interact with a MEC device plugin 1085 on the edge device 1080. These components can include a resource provisioner 1092b and a device controller 1094b.

The MEC device plugin 1085 can facilitate access to a plurality of packet core VNFs 1084 on the edge device 1080. The edge device 1080 is also shown with storage 1096. The storage 1096 can be used for storing event logs and memory dumps, which can be facilitated by the MEC device plugin 1085.

FIG. 10 also shows an eNodeB 1006 at the edge location 1078. Communication between the edge device 1080 and the eNodeB 1006 can occur via a local area network (LAN) at the edge location 1078. Communication between the components at the edge location 1078 (including the edge device 1080 and the eNodeB 1006) and the mobile connectivity platform can occur via a VPN in some embodiments.

Figure 11:
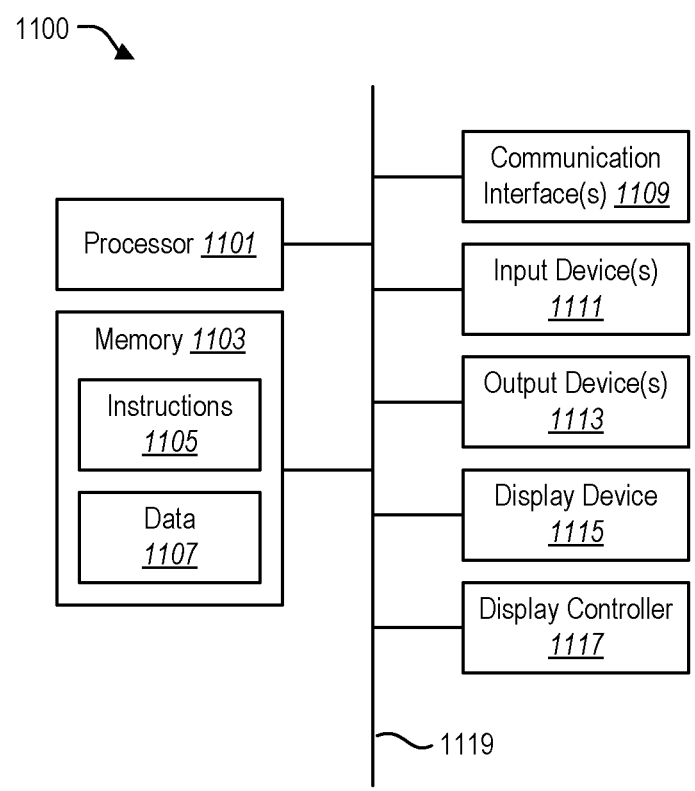
FIG. 11 illustrates certain components that can be included within a computing device.

Reference is now made to FIG. 11. One or more computing devices 1100 can be used to implement at least some aspects of the techniques disclosed herein. FIG. 11 illustrates certain components that can be included within a computing device 1100.

The computing device 1100 includes a processor 1101 and memory 1103 in electronic communication with the processor 1101. Instructions 1105 and data 1107 can be stored in the memory 1103. The instructions 1105 can be executable by the processor 1101 to implement some or all of the methods, steps, operations, actions, or other functionality that is disclosed herein. Executing the instructions 1105 can involve the use of the data 1107 that is stored in the memory 1103. Unless otherwise specified, any of the various examples of modules and components described herein can be implemented, partially or wholly, as instructions 1105 stored in memory 1103 and executed by the processor 1101. Any of the various examples of data described herein can be among the data 1107 that is stored in memory 1103 and used during execution of the instructions 1105 by the processor 1101.

Although just a single processor 1101 is shown in the computing device 1100 of FIG. 11, in an alternative configuration, a combination of processors (e.g., an ARM and DSP) could be used.

The computing device 1100 can also include one or more communication interfaces 1109 for communicating with other electronic devices. The communication interface(s) 1109 can be based on wired communication technology, wireless communication technology, or both. Some examples of communication interfaces 1109 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 1100 can also include one or more input devices 1111 and one or more output devices 1113. Some examples of input devices 1111 include a keyboard, mouse, microphone, remote control device, button, joystick, trackball, touchpad, and lightpen. One specific type of output device 1113 that is typically included in a computing device 1100 is a display device 1115. Display devices 1115 used with embodiments disclosed herein can utilize any suitable image projection technology, such as liquid crystal display (LCD), light-emitting diode (LED), gas plasma, electroluminescence, or the like. A display controller 1117 can also be provided, for converting data 1107 stored in the memory 1103 into text, graphics, and/or moving images (as appropriate) shown on the display device 1115. The computing device 1100 can also include other types of output devices 1113, such as a speaker, a printer, etc.

The various components of the computing device 1100 can be coupled together by one or more buses, which can include a power bus, a control signal bus, a status signal bus, a data bus, etc. For the sake of clarity, the various buses are illustrated in FIG. 11 as a bus system 1119.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for providing a managed networking service for a cloud computing system that enables implementation of managed applications at edge locations, the method comprising:
   registering a plurality of external entities for the managed networking service, the plurality of external entities providing a plurality of managed resources for the managed networking service, the managed networking service being implemented on the cloud computing system;
   receiving user input from a user of the cloud computing system, the user input comprising a request to deploy the plurality of managed resources associated with the plurality of external entities at an edge location;
   maintaining a plurality of resource logical entities in a database utilized by the managed networking service, the plurality of resource logical entities being associated with the plurality of managed resources;
   causing the plurality of managed resources associated with the plurality of the external entities to be deployed on one or more edge devices located at the edge location; and
   associating monitored performance information with the plurality of resource logical entities in the database utilized by the managed networking service.

2. The method of claim 1, wherein the user input comprises configuration information for configuring the plurality of managed resources, wherein the method further comprises:
   providing the configuration information received from the user to the plurality of external entities;
   obtaining a configuration script for configuring at least one managed resource from an associated external entity from the plurality of external entities; and
   causing the configuration script to be sent to and executed on the one or more edge devices.

3. The method of claim 1, wherein the plurality of managed resources comprises one of:
   a virtualized network function (VNF) provided by a first external entity from the plurality of external entities; or
   a physical resource provided by the first external entity.

4. The method of claim 1, further comprising:
   wherein a first managed resource from the plurality of managed resources comprises a first virtualized network function (VNF) being provided by a first external entity, and
   wherein a second managed resource from the plurality of managed resources comprises a first physical resource being provided by a second external entity.

5. The method of claim 1, further comprising:
   receiving a request for performance information of at least one managed resource from the plurality of managed resources deployed on the one or more edge devices; and
   in response to receiving the request for performance information, providing access to the monitored performance information associated with at least one managed resource logical entity associated with the at least one managed resource from the database.

6. The method of claim 1, wherein the user input includes a request to deploy a private mobile network, and wherein the plurality of managed resources includes managed resources of the private mobile network.

7. The method of claim 6, wherein the plurality of managed resources includes a combination of at least one virtualized network function (VNF) and at least one physical function for implementing the private mobile network.

8. The method of claim 6, further comprising maintaining a private mobile network logical entity in the database utilized by the managed networking service, wherein the at least one resource logical entity from the plurality of resource logical entities is represented within the private mobile network logical entity.

9. The method of claim 1, further comprising providing management tools that enable the plurality of external entities to perform management functions for the plurality of managed resources.

10. The method of claim 1, wherein the user input further comprises instructions for chaining the plurality of managed resources with one or more additional managed resources, the method further comprising causing at least one managed resource from the plurality of managed resources to be chained with one or more additional managed resources based on the instructions.

11. A method for providing a mobile connectivity service for a cloud computing system, the method comprising:
   registering a plurality of external entities for the mobile connectivity service, wherein the plurality of external entities provide resources for implementing private mobile networks;
   receiving a user input comprising a request to deploy a plurality of managed resources associated with the plurality of external entities in a private mobile network, the user input including selections of the plurality of managed resources associated with implementing the plurality of managed resources in the private mobile network, the selections being selected from resources provided by the plurality of external entities through the mobile connectivity service;
   causing a packet core for the private mobile network using the plurality of managed resources to be deployed;
   representing the private mobile network as a private mobile network logical entity in a database that is utilized by the mobile connectivity service; and
   associating monitored performance information of the plurality of managed resources with the provide mobile network logical entity in the database utilized by the mobile connectivity service.

12. The method of claim 11, wherein the private mobile network is a 5G mobile network.

13. The method of claim 11, wherein at least one of the selections of the plurality of managed resources comprises a selection of a virtualized network function (VNF) provided by an external entity from the plurality of external entities.

14. The method of claim 11, wherein causing the packet core to be deployed includes allocating computing resources within the cloud computing system for running the plurality of managed resources.

15. The method of claim 11, wherein causing the packet core to be deployed includes causing one or more of the plurality of managed resources to be sent to at least one of an on-premises network that is distinct from the cloud computing system, a colocation center, a public cloud provider, or an edge location of a telecommunication company.

16. The method of claim 11, wherein the selections of the plurality of managed resources include a selection of at least one physical resource for the private mobile network, the at least one physical resource being selected from the resources provided by the plurality of external entities through the mobile connectivity service.

17. The method of claim 11, wherein the private mobile network logical entity includes:
   at least one virtual resource logical entity representing at least one virtual resource that implements the private mobile network; and
   at least one physical resource logical entity representing at least one physical resource that implements the private mobile network.

18. A system for providing a managed networking service for a cloud computing system, comprising:
   at least one processor;
   memory in electronic communication with the at least one processor; and
   instructions stored in the memory, the instructions being executable by the at least one processor to:
      register a plurality of external entities for the managed networking service, the plurality of external entities providing a plurality of managed resources for the managed networking service, the managed networking service being implemented on the cloud computing system;
      receive user input from a user of the cloud computing system, the user input comprising a request to deploy the plurality of managed resources associated with the plurality of external entities at an edge location;
      maintain a plurality of resource logical entities in a database utilized by the managed networking service, the plurality of resource logical entities being associated with the plurality of managed resources;
      cause the plurality of managed resources associated with the plurality of the external entities to be deployed on one or more edge devices located at the edge location; and
      associate monitored performance information with the plurality of resource logical entities in the database utilized by the managed networking service.

19. The system of claim 18, wherein the user input includes a request to deploy a private mobile network, and wherein the plurality of managed resources includes managed resources of the private mobile network, and wherein the plurality of managed resources includes a combination of at least one virtualized network function (VNF) and at least one physical function for implementing the private mobile network.

20. The system of claim 18, wherein the plurality of managed resources comprises one of:
   a virtualized network function (VNF) provided by a first external entity from the plurality of external entities; or
   a physical resource provided by the first external entity.

* * * * *